(12) United States Patent
Koppal et al.

(10) Patent No.: US 10,352,789 B2
(45) Date of Patent: Jul. 16, 2019

(54) MEASURING STRAIN ON DISPLAY DEVICE

(71) Applicant: Microsoft Technology Licensing, LLC, Redmond, WA (US)

(72) Inventors: Rohit Krishna Koppal, Sammamish, WA (US); Chandrashekar Gernipalli Subba, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/428,772

(22) Filed: Feb. 9, 2017

(65) Prior Publication Data

US 2018/0224340 A1 Aug. 9, 2018

(51) Int. Cl.
| | |
|---|---|
| *G01L 1/20* | (2006.01) |
| *G01L 1/22* | (2006.01) |
| *G02F 1/1345* | (2006.01) |
| *G02F 1/1333* | (2006.01) |
| *G02F 1/1362* | (2006.01) |

(52) U.S. Cl.
CPC ............ *G01L 1/205* (2013.01); *G01L 1/2206* (2013.01); *G02F 1/13452* (2013.01); *G02F 1/13454* (2013.01); *G02F 2001/133302* (2013.01); *G02F 2001/136254* (2013.01)

(58) Field of Classification Search
CPC .................................. G01L 1/205; G01L 1/00
See application file for complete search history.

(56) References Cited

U.S. PATENT DOCUMENTS

| | | | |
|---|---|---|---|
| 5,837,619 | A | 11/1998 | Adachi et al. |
| 7,460,216 | B2 | 12/2008 | Lecomte et al. |
| 7,465,678 | B2 | 12/2008 | Bhattacharya et al. |
| 7,726,199 | B2 | 6/2010 | Shkel et al. |
| 8,272,273 | B2 | 9/2012 | Chen et al. |
| 8,650,966 | B2 | 2/2014 | McMillan |
| 8,655,635 | B2 | 2/2014 | Noonan |

(Continued)

FOREIGN PATENT DOCUMENTS

| | | |
|---|---|---|
| CN | 204833206 U | 12/2015 |
| KR | 20140022180 A | 2/2014 |
| WO | 2015099001 A1 | 7/2015 |

OTHER PUBLICATIONS

Pan, et al., "Drop simulation/experimental verification and shock resistance improvement of TFT-LCD monitors", In Journal of Microelectronics Reliability, Feb. 12, 2007, pp. 2249-2259.

(Continued)

*Primary Examiner* — Jamel E Williams
(74) *Attorney, Agent, or Firm* — Holzer Patel Drennan

(57) ABSTRACT

A display includes a thin-film transistor (TFT) glass layer having a top surface and a bottom surface and a color-filter glass layer having a top and a bottom surface. The TFT glass layer extends beyond the color-filter glass layer to form an overhanging portion of the TFT glass layer. The overhanging portion is flexible, and a flexible printed circuit (FPC) is affixed to the overhanging portion. The FPC includes an integrated strain gauge for measuring strain at a plurality of locations on the overhanging portion of the TFT glass layer. The display device may be incorporated into a chassis to secure the display in the device. A processor, within the housing, may instruct the strain gauge to measure the strain.

12 Claims, 14 Drawing Sheets

(56) References Cited

U.S. PATENT DOCUMENTS

| | | |
|---|---|---|
| 8,922,523 B2 | 12/2014 | Lynch et al. |
| 2006/0030062 A1 | 2/2006 | He et al. |
| 2007/0239409 A1 | 10/2007 | Alan |
| 2009/0216509 A1 | 8/2009 | Baker et al. |
| 2010/0123686 A1 | 5/2010 | Klinghult et al. |
| 2013/0066619 A1 | 3/2013 | Noonan |
| 2013/0082973 A1 | 4/2013 | Wurzel et al. |
| 2013/0127606 A1 | 5/2013 | Chang |
| 2013/0136874 A1 | 5/2013 | Xia et al. |
| 2013/0340533 A1 | 12/2013 | Hoffman et al. |
| 2014/0331781 A1 | 11/2014 | Lee et al. |
| 2015/0050916 A1 | 2/2015 | Bandyopadhyay et al. |
| 2015/0296622 A1 | 10/2015 | Jiang et al. |
| 2016/0169664 A1 | 6/2016 | Hayashi et al. |
| 2016/0293884 A1 | 10/2016 | Zhang et al. |
| 2016/0313234 A1 | 10/2016 | Sudo et al. |
| 2016/0338188 A1* | 11/2016 | Dighde .............. H05K 1/028 |
| 2018/0173028 A1* | 6/2018 | Koppal .............. G02F 1/1309 |

OTHER PUBLICATIONS

"TDM Technology", http://www.insidix.com/INSIDIX-Technologies.6.0.html, Retrieved on: Sep. 30, 2016, 1 page.

Singh, et al., "Deformation of Display for Handheld Devices During Drop Impact", In Proceedings of IEEE 66th Electronic Components and Technology Conference, May 31, 2016, 2 pages.

Wang, et al., "Deformation capture and modeling of soft objects", In Journal of ACM Transactions on Graphics, vol. 34, No. 4, Aug. 9, 2015, 12 pages.

U.S. Appl. No. 15/385,855, filed Dec. 20, 2016 titled "Measuring Strain on Display Device."

"Notice of Allowance Issued in U.S. Appl. No. 15/385,855", dated Jul. 18, 2018, 10 Pages.

* cited by examiner

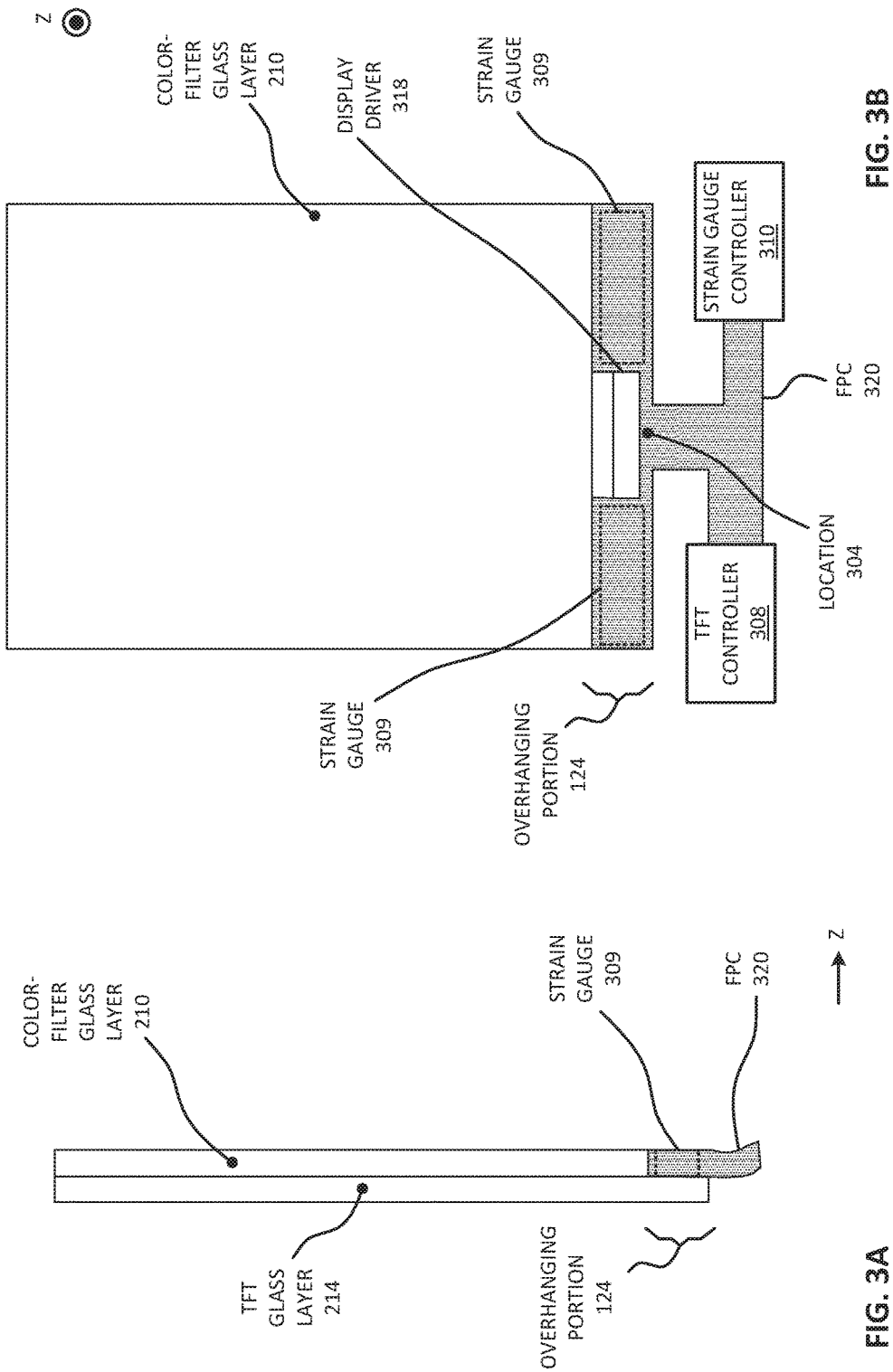

MEASURING STRAIN ON DISPLAY DEVICE

BACKGROUND

Consumers often prefer that mobile devices, such as tablet computers, mobile telephones, and laptops, are thin and light. To achieve thin and light devices, manufacturers may choose to reduce the weight and thickness of the housing and chassis that hold and protect the components within the devices. Lighter and thinner housings and chassis, however, may make the components of the mobile device more prone to failure. For example, dropping the device may break the display of the device.

BRIEF DESCRIPTION OF THE DRAWINGS

FIGS. 2A and 23 illustrate exemplary cross-sectional views of display devices;

FIGS. 3A, 3B, 3C, 3D, and 3E illustrate exemplary strain gauges relative to a color-glass filter and a TFT glass layer;

DESCRIPTION

The following detailed description refers to the accompanying drawings. The same reference numbers in different drawings may identify the same or similar elements. Also, the following detailed description is exemplary and explanatory only and is not restrictive of the invention, as claimed.

A display device, such as a tablet computer, has a housing or a chassis to hold and protect the components of the device. For example, the chassis may protect the display of the device, including the touch-screen module that receives input from the user. All too often, users drop their devices, which may cause displays to fail. As manufactures design lighter and thinner chassis to improve user experience, chassis lose stiffness and displays become even more prone to failing when dropped. Although users may be happy with a lighter and thinner device, users are generally not happy when the chassis of their device does not provide adequate protection.

Manufacturers may design and test devices in an iterative process: a device is designed, made, tested, and designed again based on the test results. The process repeats itself. For example, a manufacturer may design and make a test device with a test chassis. To test the device, the manufacturer drops the device to see whether the display fails (e.g., the touch module fails or the display cracks). If the display fails, the manufacturer may redesign the device with a redesigned (hopefully improved) chassis, and make the device again but with the improved chassis. After another drop test, the manufacturer determines whether the device meets its drop-test requirements.

The design/build/test process described above, however, can be very time consuming and expensive. Embodiments described below may enable a more rapid prototyping and testing of devices. As a result, these embodiments may enable lighter and less expensive display devices, while still providing the desired structural support and protection. As an additional result, these embodiments may enable manufactured devices to be more reliable when used by consumers in the field. Because the device itself may be lighter, some embodiments enable a more rapid assembly or disassembly of devices with lighter and faster assembly equipment.

Figure 1A:
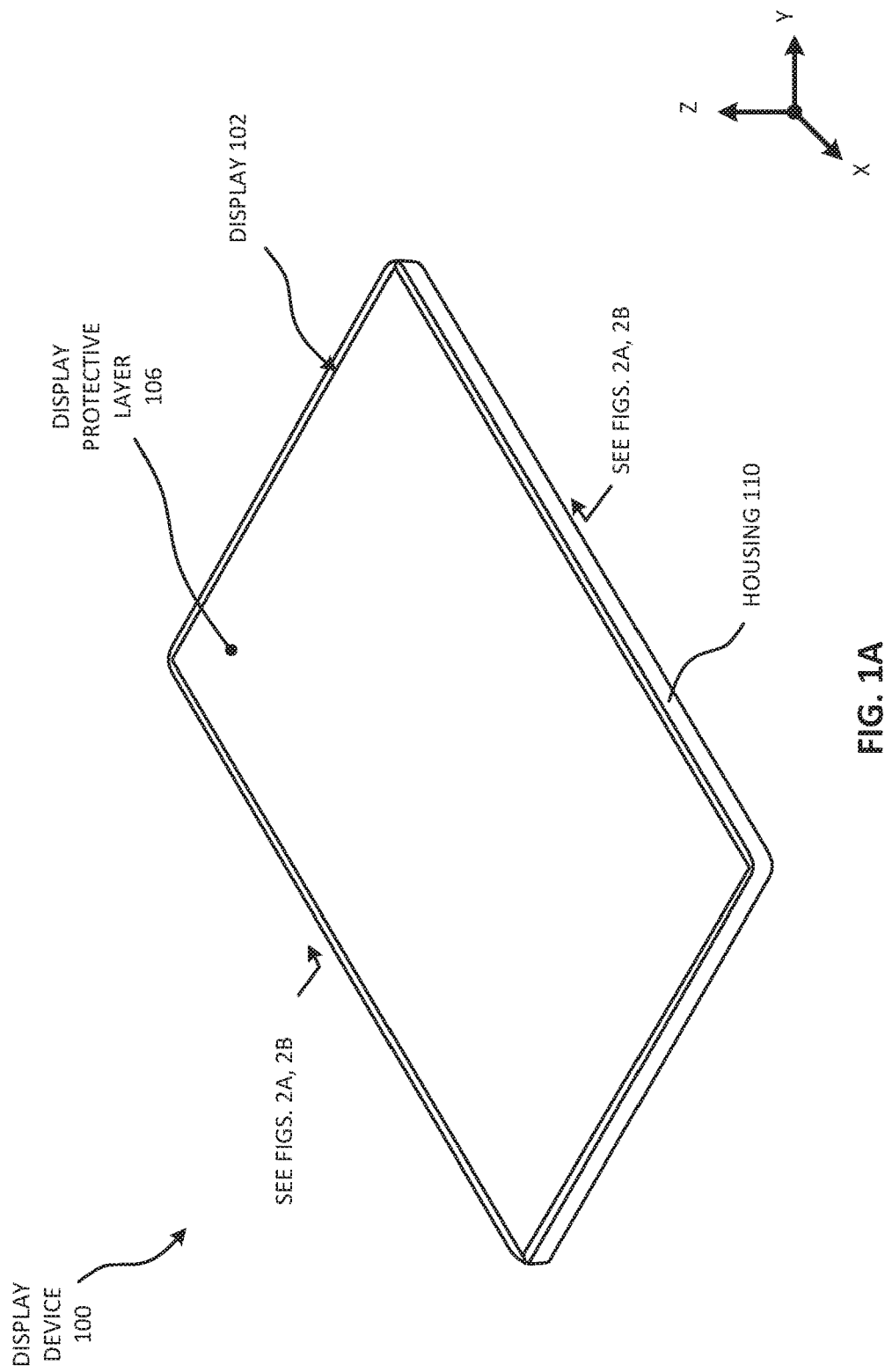
FIG. 1A illustrates an exemplary display device in one embodiment.

FIG. 1A is a perspective view of an exemplary display device 100, in one embodiment, manifest as a tablet computer. Although display device 100 is shown as a tablet computer in FIG. 1A, display device 100 may be a mobile phone, a laptop, or any other device with a display for viewing. Display device 100 includes a display 102 surrounded by a housing 110 to encompass and protect the components of display device 100, including display 102. The top-most (e.g. exposed) layer of display 102 may include a protective layer 106. FIG. 1A also defines an x-axis, y-axis, and z-axis such that the exposed layer of display 102 is the "top most" layer and the "bottom" of display device 100 is not visible in FIG. 1A. Housing 110 may also be referred to as a "chassis" and it provides the frame to which components of display device 100 are attached.

Even though housing 110 protects display 102, if housing 110 experiences sufficient forces, display 102 may deform and fail. For example, if display device 100 falls and lands on the floor, glass within display 102 could crack. Such a failure may result from strain (e.g., a force) deforming or warping a component of display 102. As an example, FIG. 1B illustrates components of display 102 that may deform or warp to cause a failure.

Figure 1C:
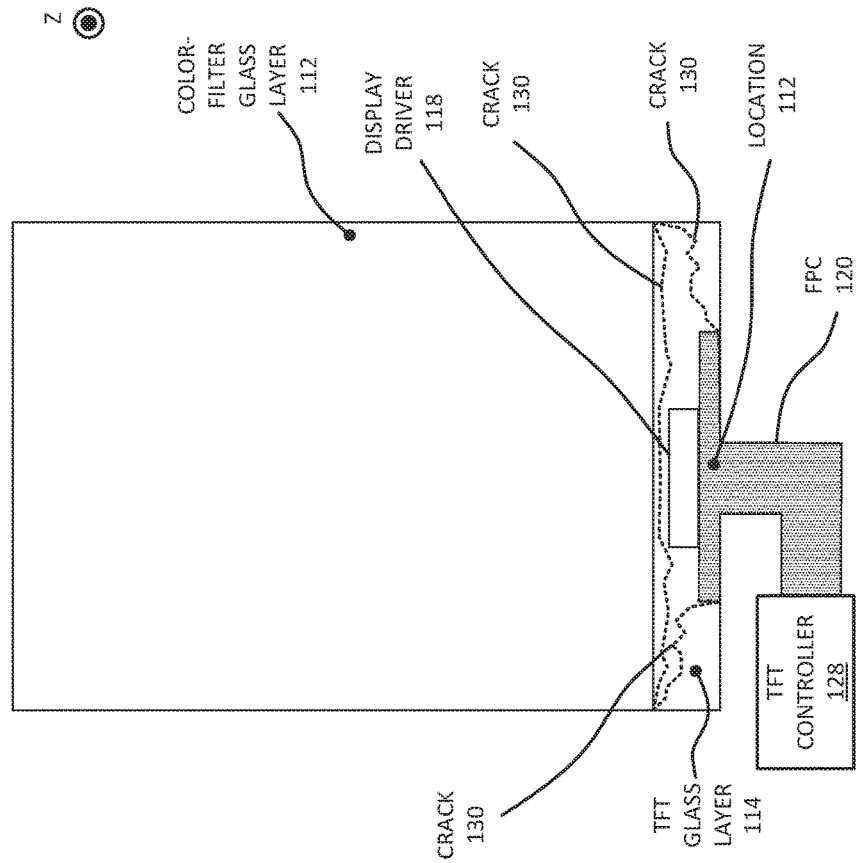
FIGS. 1B and 1C illustrate an exemplary color-glass filter and an exemplary thin-film-transistor (TFT) glass layer.
Figure 1B:
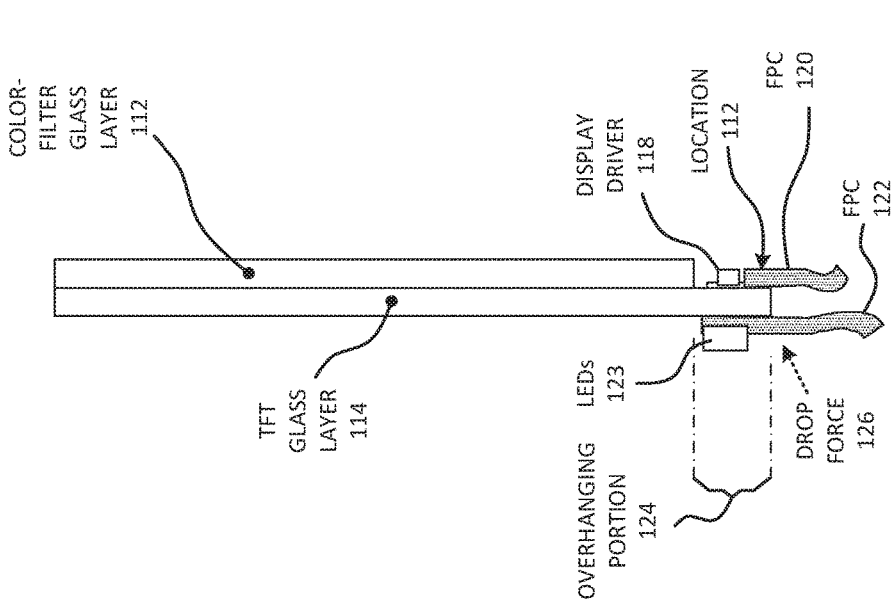

FIGS. 1B and 1C illustrate display 102 experiencing a force that causes a failure. Display 102 includes color-filter glass layer 112, TFT glass layer 114, display driver 118, a flexible printed circuit (FPC) 120, an FPC 122, and light-emitting diodes (LEDs) 123. FIG. 1B shows a side view of these components, whereas FIG. 1C shows a top view of these components, thus hiding FPC 122 and LEDs 123. Display 102 may include other components not shown in FIG. 1B or 1C.

FPC 120 is bonded (e.g., using anisotropic conductive film (ACF) bonding) to TFT glass layer 114 at location 112. FPC 120 carries signals to display driver 118 from TFT controller 128 to drive pixels on display 102. FPC 122 carries signals to LEDs 123 to provide back lighting for display 102. In this example, LEDs 123 are mounted on FPC 122 and FPC 122 may be coupled (e.g., affixed) to TFT glass layer 114 with an adhesive. FPC 122 may be connected to an LED controller (not shown in FIG. 1B or 1C) to control LEDs 123.

In this example, TFT glass layer 114 includes an overhanging portion 124. When overhanging portion 124 experiences a sufficiently large force, such as drop force 126, overhanging portion 124 may flex (e.g., deform) in the Z direction (upwardly) and/or in the negative Z direction (downwardly). Drop force 126 may be transmitted through housing 110 and other components of display device 100, for example, when device 100 falls onto a floor.

As a result of drop force 126 in this example, TFT glass layer 114 fails, as indicated by a crack 130 (shown in FIG. 1C). Crack 130 in this example is caused by overhanging portion 124 flexing in the Z direction (and/or in the negative Z direction) because of drop force 126. Designers of display device 100 may wish to design housing 110 so that a typical drop force does not cause crack 130 in TFT glass layer 114, for example. One cause of display failure (such as a touch-screen display module) in small-form factor devices is dropping the device from a height of 1.25 m to 1.5 m, or approximately waist to shoulder height.

Figure 2A:
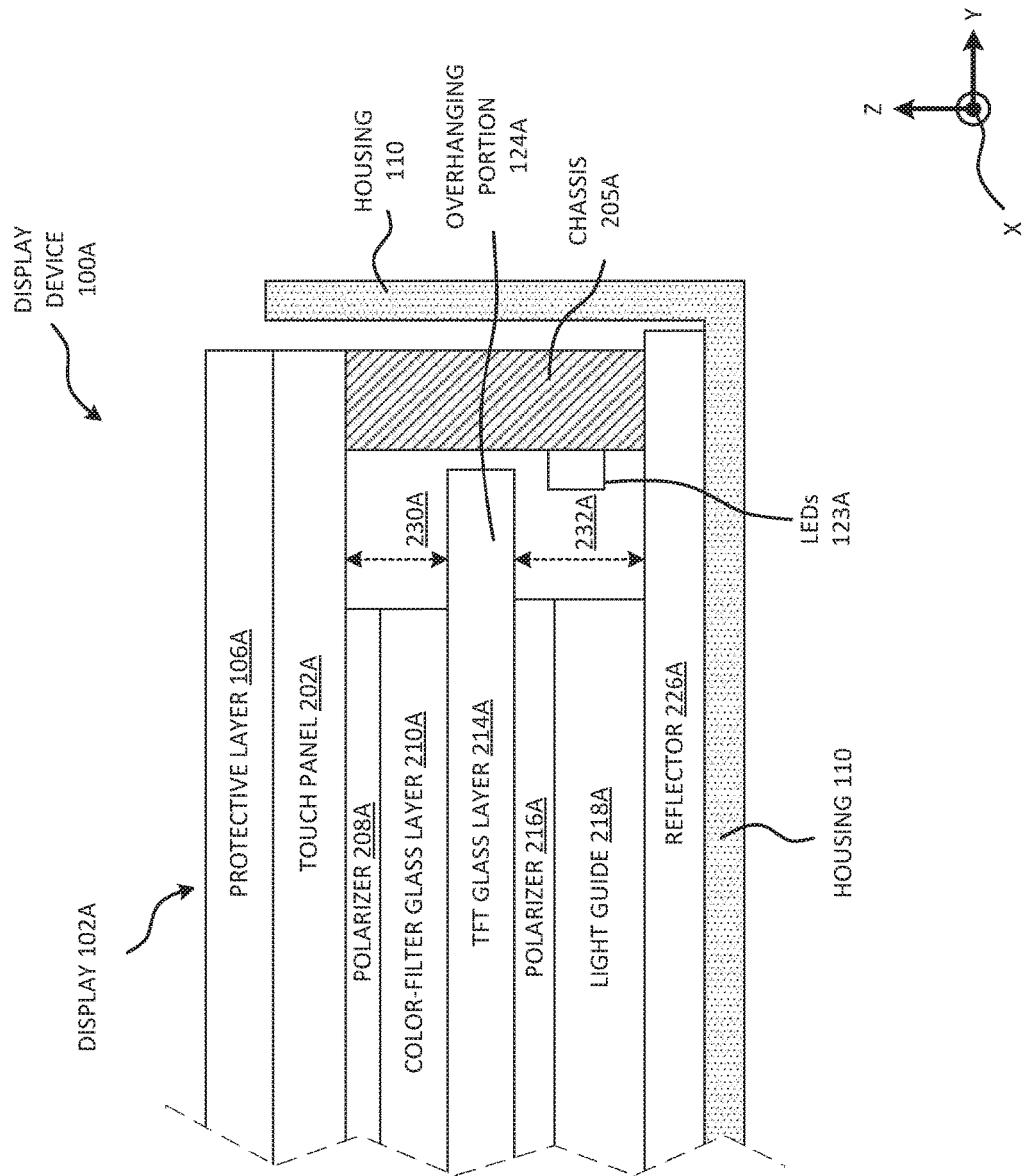
Figure 2B:
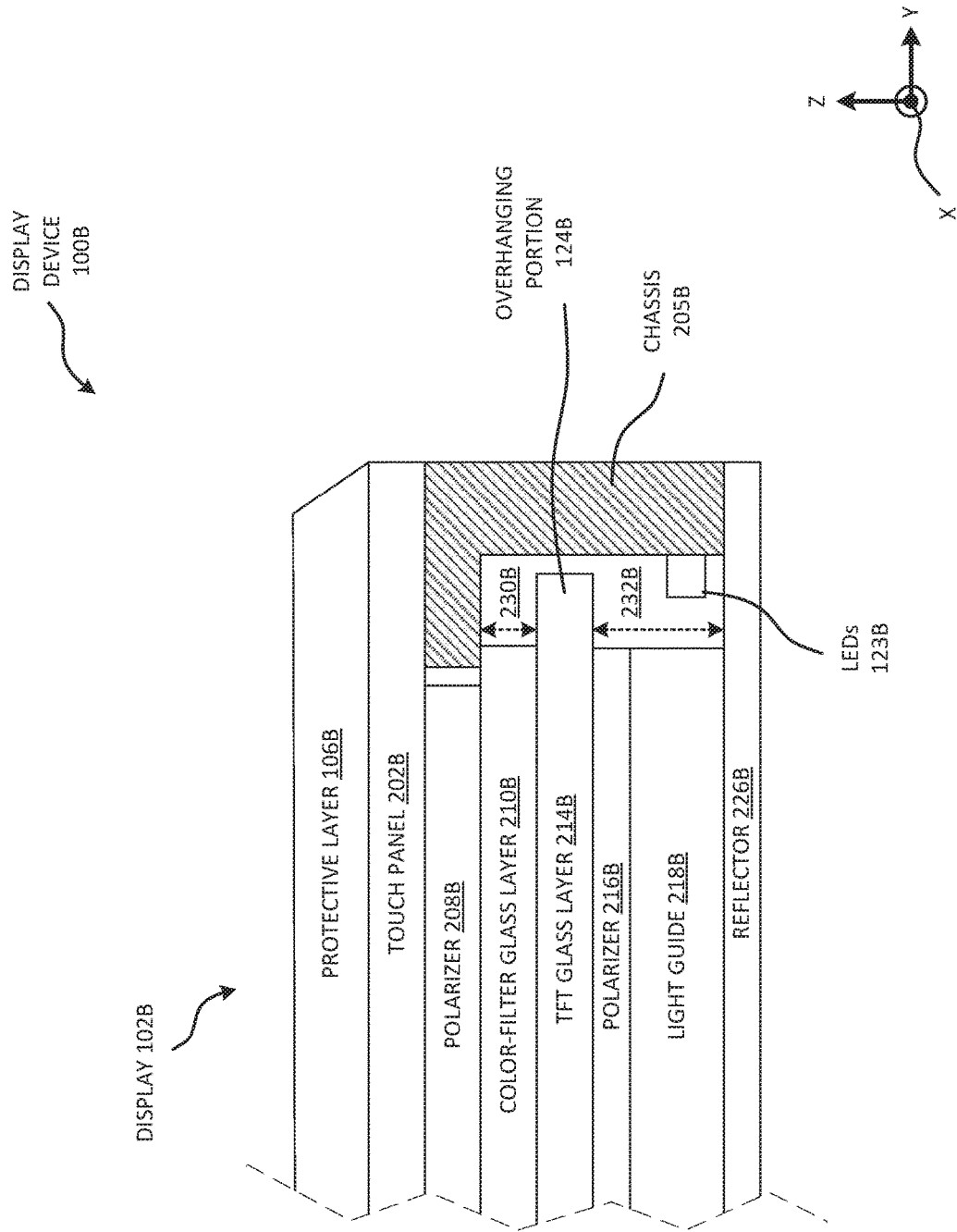

FIGS. 2A and 2B illustrate exemplary cross-sectional views of display devices in different embodiments, such as display device 100 shown in FIG. 1A. For clarity, only a portion of the sectional views are shown in FIGS. 2A and 2B.

FIG. 2A shows a cross-sectional view of a display device 100A in one embodiment. As shown, display device 100A includes housing 110 and a chassis 205A for securing the other components in display device 100A. Other components in display device 100A may include protective layer 106A, a touch panel 202A, a polarizer 208A, a color-filter glass layer 210A, TFT glass layer 214A, polarizer 216A, light guide 218A, LED 222A, and reflector 226A. The components of FIG. 2A may be referred to generally without the "A" appended to the reference number. For ease of understanding, display device 100A may include other components that are not shown, such as optically-clear adhesive (OCA) layers.

Display 102A operates as follows. LED 222A generates light that travels through light guide 218A as aided by reflector 226A. Light from light guide 218A passes through polarizer 216A and emerges into TFT glass layer 214A with a single polarization. TFT glass layer 214A includes liquid crystals to change polarization of the light as it passes through the liquid crystals to color-filter glass layer 210A. The light emerging from color-filter glass layer 210A may be of a particular color (e.g., red, green, blue). Depending on the polarization of the light (as controlled by liquid crystals of TFT glass layer 214A), the colored light may or may not pass through polarizer 208A. Colored light that does pass through polarizer 208A then passes through touch panel 202A and protective layer 106A to the user's eyes. The user may interact with display device 100A by touching touch panel 202A, for example.

TFT glass layer 214A and color-filter glass layer 210A each has a top surface (facing the positive Z direction) and a bottom surface. As shown in FIG. 2A, the bottom surface of color-filter glass layer 210A is proximate the top surface of TFT glass layer 214A. As used herein, the terms "top" and "bottom" are relative and can be interchanged. TFT glass layer 214A may extend beyond the color-Filter glass layer 210A to form an overhanging portion 124A, e.g., resulting from a gap 230A above TFT glass layer 214A and a gap 232A below TFT glass layer 214A.

Gap 230A may include FPC 120 and display driver 118 (shown in FIGS. 1B and 1C). Nonetheless, gap 230A may allow for overhanging portion 124A to flex upward (in the Z direction). Gap 232A may include FPC 122 and LEDs 123 (shown in FIGS. 1B and 1C). Nonetheless, gap 232A may allow for overhanging portion 124A to flex in the downward direction (in the negative Z direction). Such flexing or deformation may result in a failure, such as cracks 130, in TFT glass layer 214A and elsewhere. As described above with respect to FIG. 1B, flexing of overhanging portion 124 may occur when display device 100 drops and a force (e.g., drop force 126) is transmitted through housing 110 (e.g., or chassis 205A). Flexing of overhanging portion 124A may cause a failure of display 102A in the form of a crack, for example.

Gap 230A may be between 0.15 mm and 0.25 mm thick, for example. Gap 230A may have different thickness, such as from 0 to 0.05 mm, from 0.05 to 0.1 mm, from 0.1 mm to 0.15 mm, from 0.15 to 0.2 mm, from 0.2 to 0.25 mm, from 0.25 to 0.30 mm, from 0.30 to 0.35 mm, or from 0.35 to 0.40 mm. The thickness of gap 230A may depend on the thickness of color-filter glass layer 210A and/or the thickness of polarizer 208A, for example.

Gap 232A may be between 0.2 to 0.3 mm thick. Gap 232 may have different thickness, such as from 0 to 0.05 mm, from 0.05 to 0.1 mm, from 0.1 mm to 0.15 mm, from 0.15 to 0.2 mm, from 0.2 to 0.25 mm, from 0.25 to 0.30 mm, from 0.30 to 0.35 mm, or from 0.35 to 0.40 mm. Depending on the manufacture of display 102A, the thickness of gap 232A may depend on the thickness of light guide 218A and/or polarizer 216A, for example.

Chassis 205A may facilitate assembly of the display device 100A. Further, chassis 205A may facilitate disassembly, reworking, and/or removal of display 102A from the display device 100A. In other words, protective layer 106A, touch panel 202A, and/or polarizer 208A can be removed from display device 100A, followed by chassis 205A. Components can be repaired or a new chassis 205A (with associated components) can be installed.

Chassis 205A and/or housing 110 may be formed of any material that can provide structural support to the display components and/or allow features to be formed therein. Example materials can include various plastics, polymers, and/or composites, among others. If chassis 205A and/or housing 110 is formed of metal, for example, display device 100 may be heavy and/or thick, but the added weight and/or strength may reduce the likelihood of display 102A failing during assembly, use, or disassembly. Although a thicker and heavier chassis 205A and/or housing 110 may reduce the likelihood of display 102A failing, a thicker and heavier display device 100A may increase the cost and diminish the user experience. In some instances, it may be desirable to minimize the cost, weight, and thickness of chassis 205B, and/or housing 110 while providing sufficient weight, thickness, and stiffness to protect display 102A from failure at reasonable cost. Methods and systems described herein may, in one embodiment, aid the designer of display device 100A to achieve this balance between weight, thickness, stiffness, probability of failure, and cost.

FIG. 2B shows a cross-sectional view of a display device 100B. The components of display device 100B of FIG. 2B operate similarly as the components described for display device 100A of FIG. 2A. For ease of understanding, display device 100B may include other components that are not shown, such as optically-clear adhesive (OCA) layers.

Chassis 205B performs the function of housing 110 and chassis 205A of display device 100A as shown in FIG. 2A. As shown in FIG. 2B, TFT glass layer 214B includes overhanging portion 124B resulting from a gap 230B above TFT glass layer 214B and a gap 232B below TFT glass layer 214B. Gap 230B extends from TFT glass layer 214B to chassis 205B. Gap 232B extends from TFT glass layer 214B to reflector 226B. The components of FIG. 2B may be referred to generally without the "B" appended to the reference number.

Gap 230B may include FPC 120 and display driver 118 (shown in FIGS. 1B and 1C). Nonetheless, gap 230B may allow for overhanging portion 124B to flex upward (in the Z direction). Gap 232A may include FPC 122 and LEDs 123

(shown in FIGS. 1B and 1C). Nonetheless, gap 232B may allow for overhanging portion 124B to flex in the downward direction (in the negative Z direction). Such flexing or deformation may result in a failure, such as cracks in TFT glass layer 214 and elsewhere. As described above with respect to FIGS. 1B and 1C, flexing of overhanging portion 124 may occur when display device 100 falls and a force is transmitted through chassis 205B to TFT glass layer 214B. Flexing of overhanging portion 124B may cause a failure of display 102B in the form of a crack, for example.

Gap 230B may have the same thickness and/or range of thicknesses as described above for gap 230A. The thickness of gap 230B may depend on the thickness of color-filter glass layer 210B, which may be approximately the same thickness as gap 230B, for example. Gap 232B may have the same thickness and/or range of thicknesses as described above for gap 232A. The thickness of gap 232B may depend on the thickness of light guide 218B and/or polarizer 216B, which may be approximately the same thickness as gap 232B, for example.

Although a thicker and heavier chassis 205B may reduce the likelihood of display 102B failing (and potentially causing cracks), a thicker and heavier chassis 205B may increase the cost and diminish the user experience. In some instances, it may be desirable to minimize the cost, weight, and thickness of chassis 205B while providing sufficient weight, thickness, and stiffness to protect display 102B from failure at reasonable cost. Methods and systems described herein may aid the designer of display device 100B to achieve this balance between weight, thickness, stiffness, probability of failure, and cost.

Adding space between layers of display 102A may help to prevent a drop force (such as drop force 126) from transmitting through housing 110 and/or chassis 205 to TFT glass layer 214. For example, protective layer 106A and touch panel 202A may be separated by a space from polarizer 208A and color-filter glass layer 210A. While this solution may be incorporated with other embodiments discussed herein, adding space would increase the thickness of display device 100A, which may reduce the user's experience.

Display device 100 (e.g., device 100A or 100B) may include different, fewer, or more components than shown in FIGS. 2A and 23. For example, optically-clear adhesives (OCAs) may bond layers together, such as polarizer 208 and touch panel 202. Components of display 102 may include members to allow components to snap-fit into display device 100. Further, display device 100 may include components, such as a processor, that are discussed with respect to FIG. 6.

FIGS. 3A and 3B illustrate strain gauge 309 and a strain-gauge controller 310, in one embodiment, relative to color-filter glass layer 210 and TFT glass layer 214. In particular, FIG. 3A illustrates a side view of color-filter glass layer 210 stacked against TFT glass layer 214 in display 102, FIG. 3B shows a frontal view of strain gauge 309 on TFT glass layer 214. An FPC 320 may be bonded (e.g., using ACF bonding) to TFT glass layer 214 at location 304 (shown in FIG. 3B). FPC 320 carries the electrical signals from TFT controller 308 to display driver 318, for example, for controlling the polarization of light passing through TFT glass layer 214.

In one embodiment, FPC 320 may integrate strain gauge 309. FPC 320 may also carry electrical signals to and/or from strain gauge 309 and strain-gauge controller 310. Portions of FPC 320 (e.g., strain gauge 309) may be coupled (e.g., affixed) to overhanging portion 124 of TFT glass layer 214 with adhesive, for example. Strain gauge 309 may be split into multiple sections, such as a section to one side of display driver 318, a section to the other side of display driver 318, and a section above display driver 318 (as shown in FIG. 33). When overhanging portion 124 of TFT glass layer 214 becomes deformed, signals indicative of the deformation and/or strain may be transmitted from strain gauge 309 to strain-gauge controller 310 in display device 100.

Strain gauge 309 measures the deformation and/or forces imparted on overhanging portion 124 of TFT glass layer 214. Strain gauge 309 may measure the strain and/or deformation in numerous places on overhanging portion 124. For example, strain gauge 309 may measure strain on one or both sides of display driver 318. These measurements may indicate not only the deformation of (and forces on) overhanging portion 124, but also the other layers of display 102, such as TFT glass layer 214, polarizer 208, touch panel 202, and/or protective layer 106.

Figure 3D:
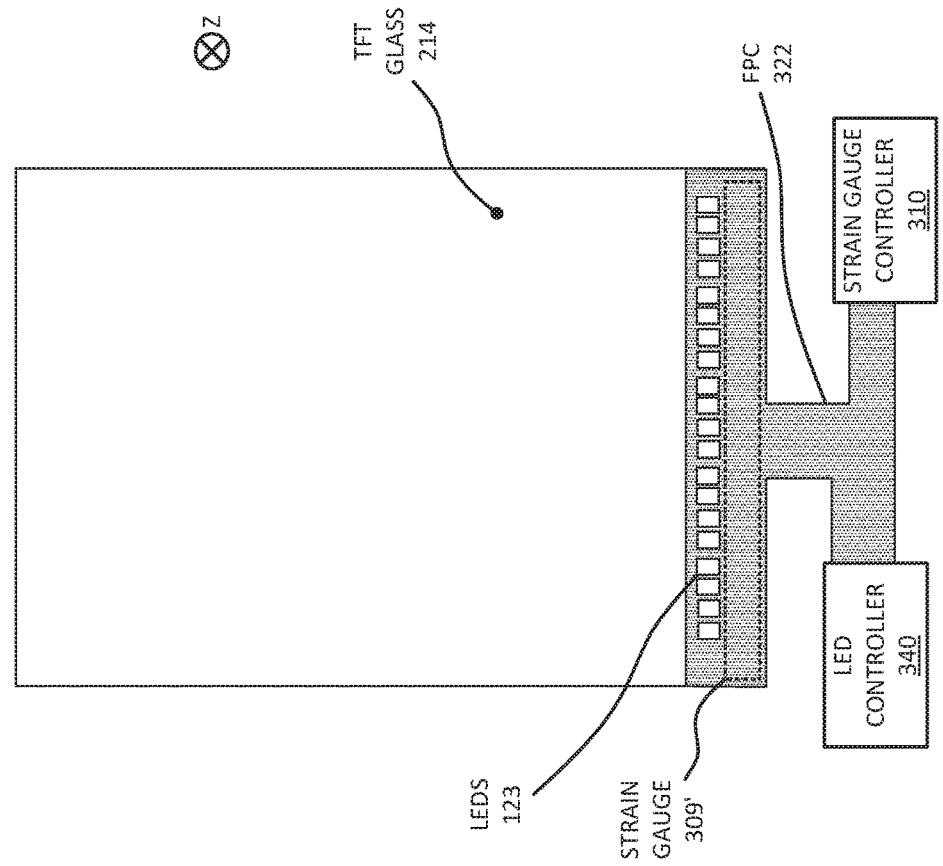
Figure 3C:
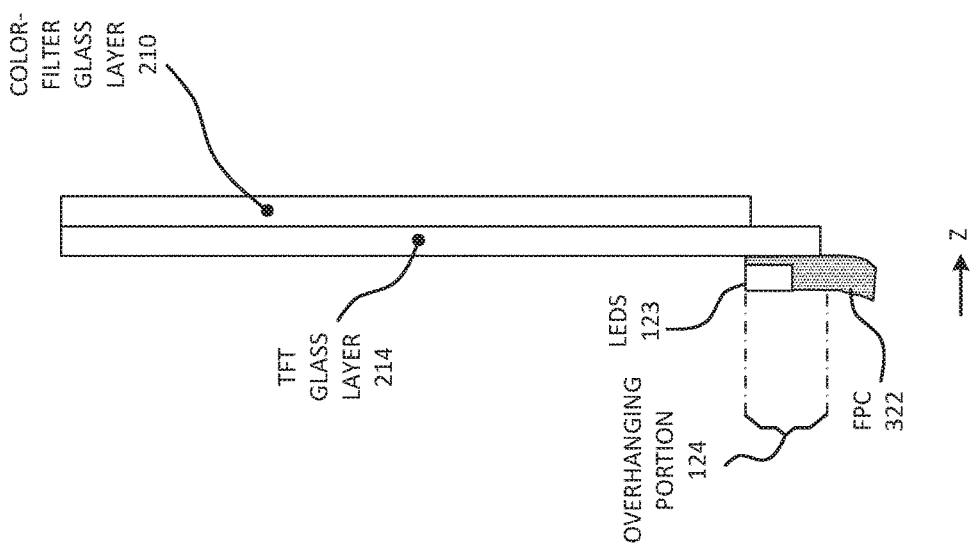

FIGS. 3C and 3D illustrate a strain gauge 309' and LED controller 340, in another embodiment, relative to color-filter glass layer 210 and TFT glass layer 214. In contrast to FIGS. 3A and 3B, FIGS. 3C and 3D show a view of strain gauge 309' on the bottom surface of overhanging portion 124 of TFT glass layer 214 (e.g., rather than on the top surface of overhanging portion 124). An FPC 322 may be connected to LEDs 123 to carry signals between LEDs 123 and LED controller 340 for LEDs 123 to provide back lighting to display 102. Portions of FPC 320 (e.g., strain gauge 309') may be coupled (e.g., affixed) to overhanging portion 124 of TFT glass layer 214 with adhesive, for example. Strain gauge 309' and strain gauge 309 may be referred to generally as "strain gauge 309."

In one embodiment, FPC 322 may also carry electrical signals to and/or from strain gauge 309' and strain-gauge controller 310. Like strain gauge 309, strain gauge 309' measures the deformation and/or forces imparted on overhanging portion 124 of TFT glass layer 214. Strain gauge 309' may measure the strain and/or deformation in numerous places on overhanging portion 124. For example, strain gauge 309 may measure strain around LEDs 123. These strain measurements may be indicative of not only the deformation of (and forces on) overhanging portion 124, but also the other layers of display 102, such as color-filter glass layer 210, TFT glass layer 214, polarizer 208, touch panel 202, and/or protective layer 106.

When overhanging portion 124 of TFT glass layer 214 becomes deformed, signals indicative of the deformation and/or strain may be transmitted from strain gauge 309 (e.g., strain gauge 309 or 309') to strain-gauge controller 310 in display device 100. As overhanging portion 124 deforms (e.g., warps), a force may be exerted on strain gauge 309 and characteristics (e.g., resistance and/or reactance) of components in strain gauge 309 may change. For example, the resistance of a resistor, the capacitance of a capacitor, and/or the inductance or an inductor in strain gauge 309 may change. Strain-gauge controller 310 may detect or measure the change in characteristics of components in strain gauge 309 and determine the magnitude of strain applied to or degree of deformation of overhanging portion 124.

Strain gauge 309 (e.g., strain gauge 309 or 309') may include any material that has characteristics that can be measured that change in response to force on or deformation of one or more components of display 102, such as overhanging portion 124 of TFT glass layer 214. In one embodiment, strain gauge 309 may include one or more thin films spaced at a distance that vary in capacitance when force is applied to one of the films (e.g., by the deformation of overhanging portion 124). In another embodiment, strain gauge 309 may include one or more components that vary in resistance when force is applied to the components (e.g., by the deformation of overhanging portion 124). Other embodiments of strain gauge 309 may include piezoelectric material and/or optical materials that have characteristics that change when force is applied to the materials (e.g., by deformation of overhanging portion 124).

Figure 3E:
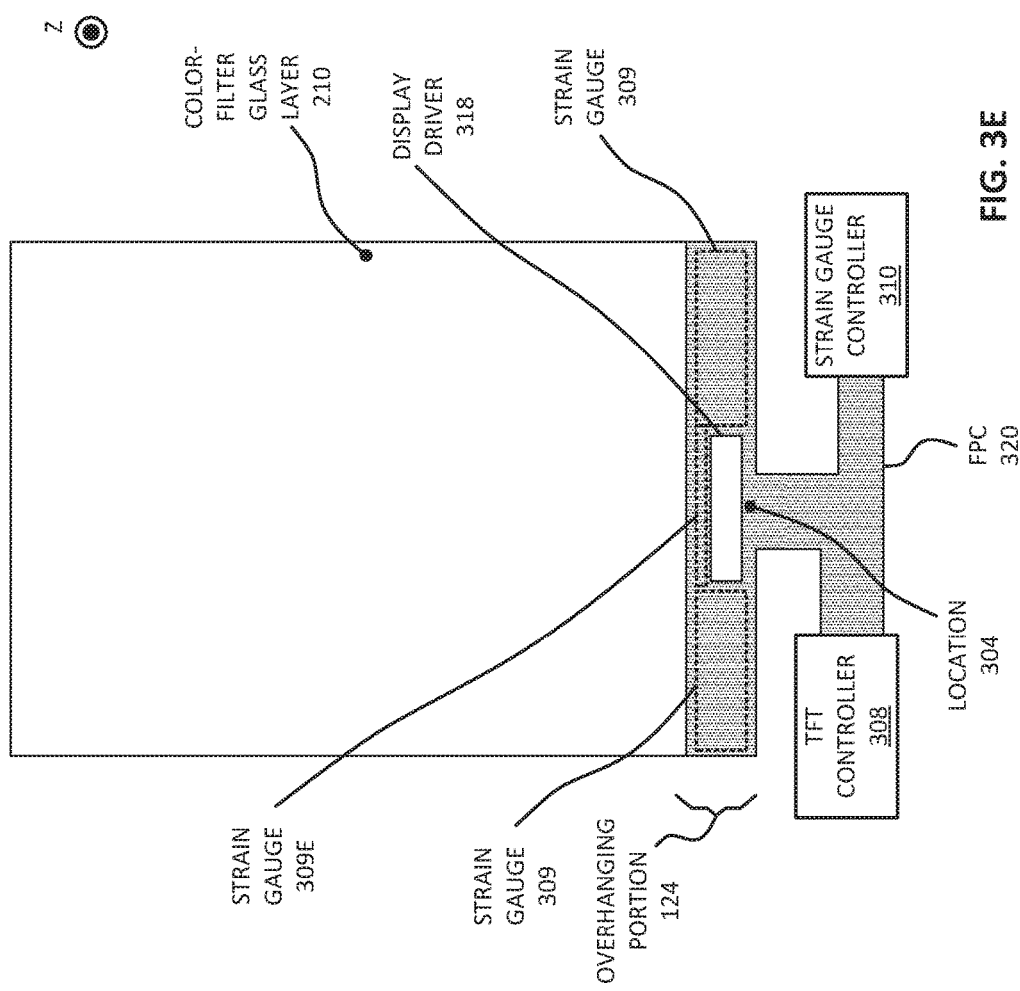

The locations of strain gauge 309 and 309' in FIGS. 3A through 3D are exemplary. FPC 320 and/or FPC 322 may include a strain gauge anywhere in FPC 320 and/or 322 to measure strain on overhanging portion 124. For example, FIG. 3E shows strain gauge 309 integrated into FPC 320 in another embodiment. FPC 320 includes strain gauge 309E above (e.g., in the negative X direction) display driver 318 as well as to each side of display driver 318.

Although strain gauge 309 is shown in FIGS. 3A through 3E as coupled (e.g., affixed) directly to overhanging portion 124 of TFT glass layer 214, strain gauge 309 may be directly coupled (e.g., affixed) to other layers and/or sides of layers in display 102. For example, a strain gauge may be incorporated into display device 100 as shown and described in U.S. patent application Ser. No. 15/385,855, filed Dec. 20, 2016, and titled "Measuring Strain on Display Device," which is incorporated herein. As another example, strain gauge 309 may be directly coupled (e.g., affixed) to either side (e.g., top or bottom) of: color-filter glass layer 210, TFT glass layer 214, polarizer 215, light guide 218, reflector 226, protective layer 106, touch panel 202, and/or polarizer 208. In addition, more than one strain gauge 309 may be employed in display device 100 (e.g., two, three, four, five, six, seven, eight, or nine or more layers).

As noted above, strain gauge 309 may be attached to any surface of any of the components of display device 100. Since the components of display device 100 are tightly assembled, the strain measurements of one component are also indicative of the force on or the deformation of other components of display device 100. For example, strain measured on the top of TFT glass layer 214 may be indicative of strain on protective layer 106, touch panel 202, polarizer 208, color-filter glass layer 210, polarizer 216, light guide 218, and/or reflector 226. Likewise, the strain measured on the bottom of TFT glass layer 214 may be indicative of strain on protective layer 106, touch panel 202, polarizer 208, color-filter glass layer 210, polarizer 216, light guide 218, and/or reflector 226.

Further, although TFT LCDs are discussed above, strain gauge 309 may be incorporated into any type of display, such as an organic light-emitting diode display (OLED) surface-conduction electron-emitter display (SED), field-emission display (FED), cathode ray tube display (CRD), light-emitting diode display (LED), electroluminescent display (ELD), electronic paper or e-ink display, a high-performance addressing LCD display, a quantum dot display, and/or an interferometric modular display. In fact, the methods and systems described herein may apply to detecting failures (e.g., due to strain) on devices other than devices that have displays.

Figure 4A:
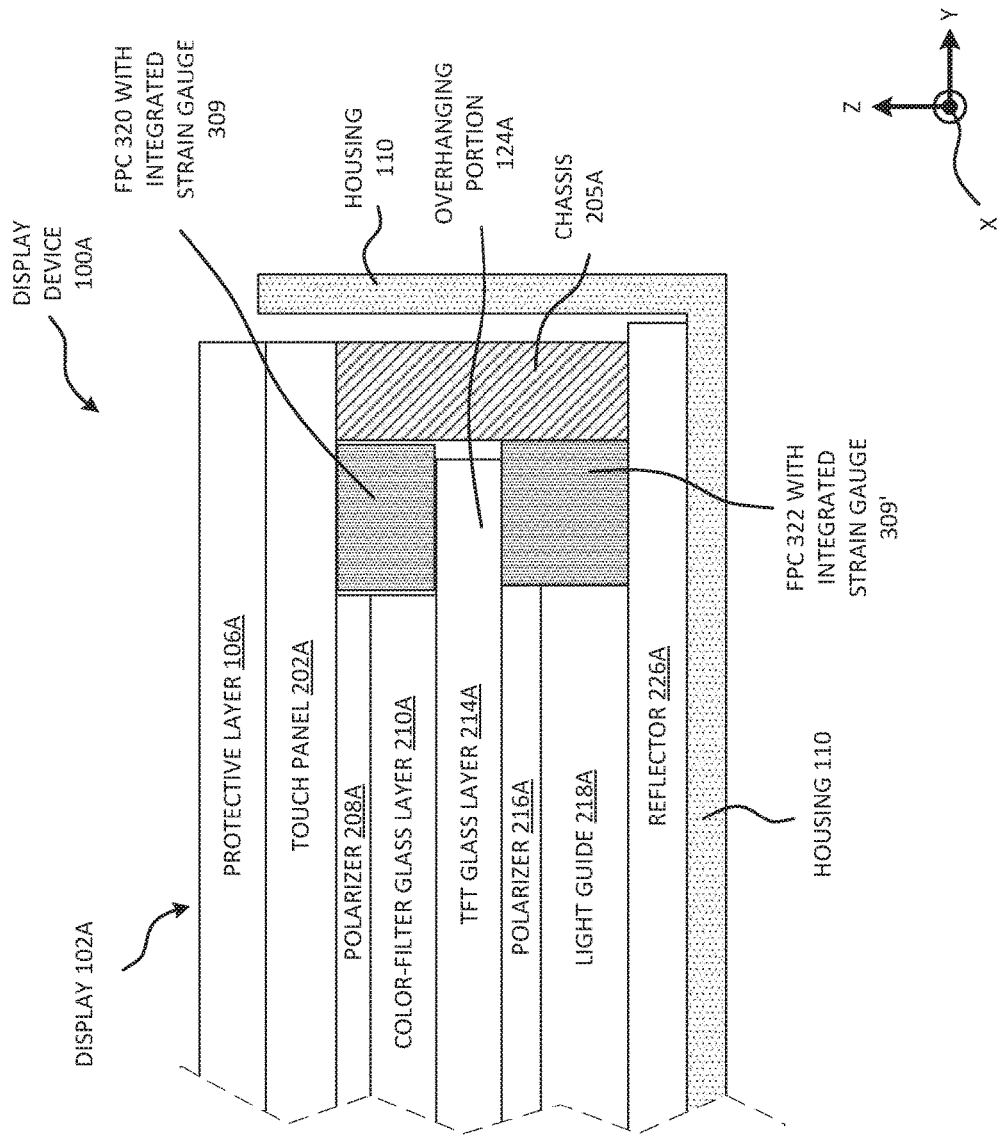
FIGS. 4A and 4B illustrate exemplary cross-sectional views of display devices with strain gauges.
Figure 4B:
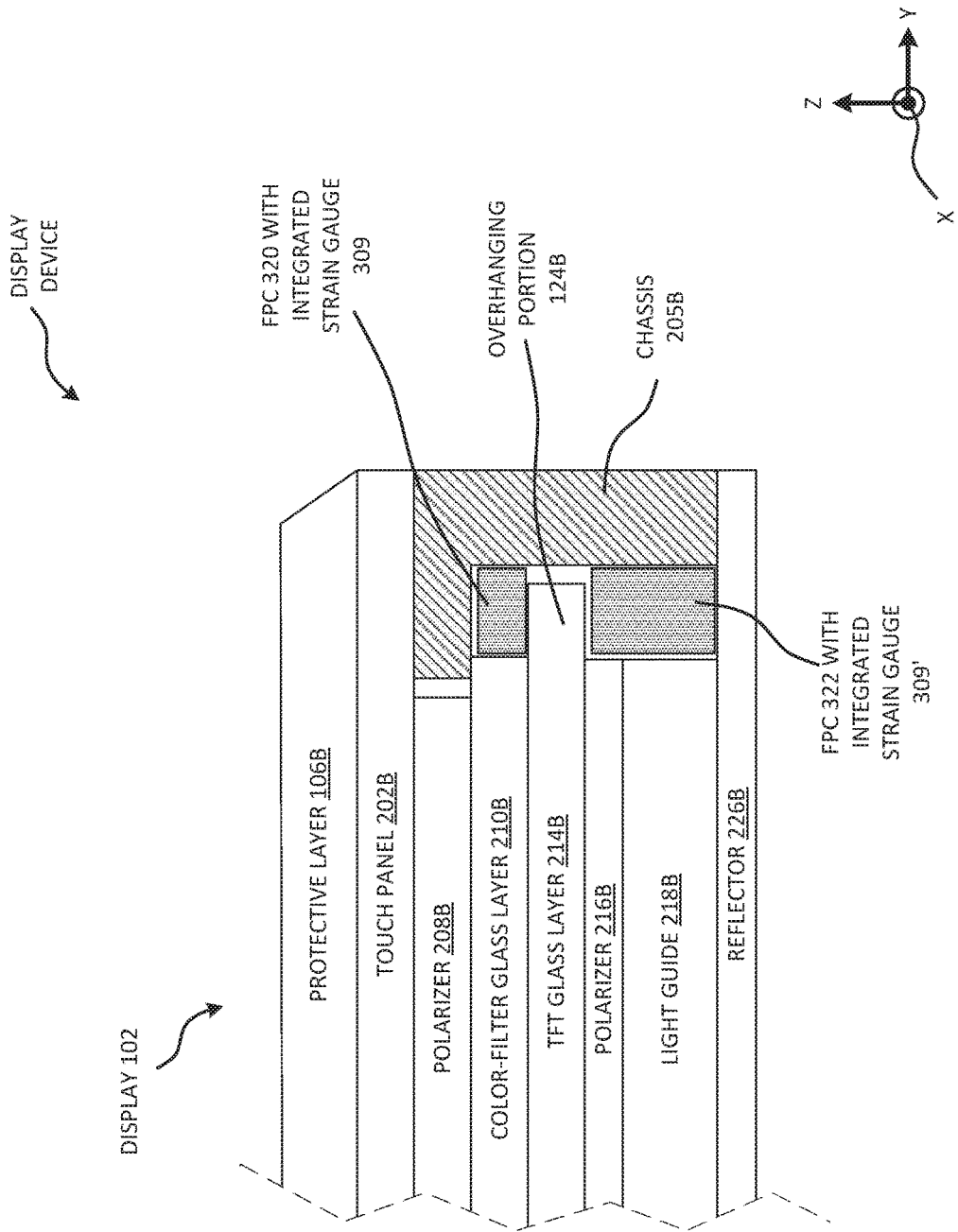

FIG. 4A shows a cross-sectional view of the display device of FIG. 2A with FPC 320 filling gap 230A and FPC 322 filling gap 232A. FIG. 4B shows a cross-sectional view of the display device of FIG. 2B with FPC 320 filling gap 230E and FPC 322 filling gap 232B.

As shown in both FIGS. 4A and 4B, FPC 320 (incorporating strain gauge 309) may enable overhanging portion 124 to resist flexing upward (in the Z direction). Likewise, FPC 322 (incorporating strain gauge 309') may enable overhanging portion 124 to resist flexing downward (in the negative Z direction). In this embodiment, resisting the flexing or deformation of overhanging portion 124 may prevent a failure, such as cracks (e.g., cracks 130) in TFT glass layer 214 and elsewhere. Parts of FPC 320 and/or FPC 322 may be affixed to TFT glass layer 214 with an adhesion layer (not shown), for example.

FPC 320, which incorporates strain gauge 309, may be between 0.15 mm and 0.25 mm thick, for example. FPC 320 may have different thickness in different embodiments, such as from 0 to 0.05 mm, from 0.05 to 0.1 mm, from 0.1 mm to 0.15 mm, from 0.15 to 0.2 mm, from 0.2 to 0.25 mm, from 0.25 to 0.30 mm, from 0.30 to 0.35 mm, or from 0.35 to 0.40 mm. The thickness of FPC 320 may depend on the thickness of color-filter glass layer 210A and/or the thickness of polarizer 208A, for example.

FPC 322, which incorporates strain gauge 309', may be between 0.2 to 0.3 mm thick. FPC 322 may have different thickness in different embodiments, such as from 0 to 0.05 mm, from 0.05 to 0.1 mm, from 0.1 mm to 0.15 mm, from 0.15 to 0.2 mm, from 0.2 to 0.25 mm, from 0.25 to 0.30 mm, from 0.30 to 0.35 mm, or from 0.35 to 0.40 mm. Depending on the manufacture of display 102A, the thickness of FPC 322 may depend on the thickness of light guide 218A and/or polarizer 216A, for example.

With gap 230 and/or gap 232 filled (e.g., fully or partially) as shown in FIGS. 4A and 43, the likelihood of display 102 failing during assembly, use, or disassembly may be reduced. Further, with gap 230 and/or gap 232 filled, it may be possible to minimize the cost, weight, and thickness of chassis 205 and/or housing 110 while providing sufficient weight, thickness, or stiffness to protect display 102 from failure at reasonable cost. Additionally or alternatively, in some embodiments, gaps 230 and/or 232 may be filled with materials other than FPC and/or a strain gauge (e.g., to resist overhanging portion 124 from flexing or deforming). For example, some or all of gaps 230 and/or 232 may be filled with foam, plastic, polymer, and/or composite material among others types of material. Methods and systems described herein may, in one embodiment, aid the designer of display device 100 to achieve this balance between weight, thickness, probability of failure, and cost.

Figure 5:
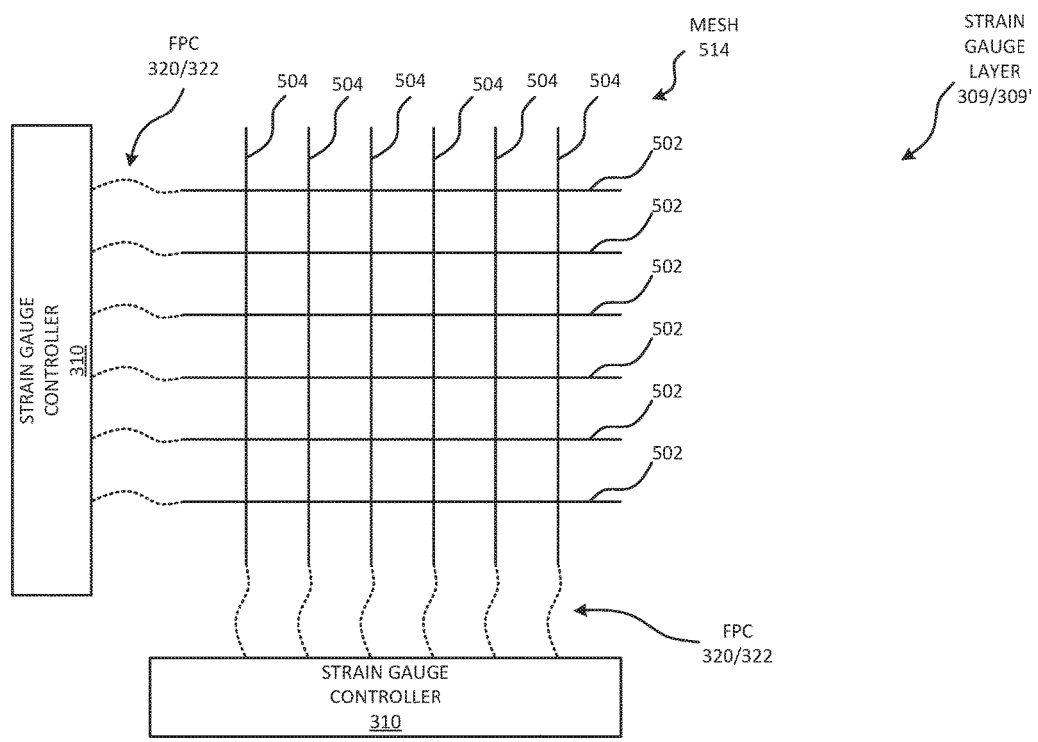
FIG. 5 illustrates an exemplary strain-gauge in one embodiment.

FIG. 5 illustrates an exemplary strain gauge 309 and/or 309' (generally strain gauge 309) in one embodiment. Strain gauge 309 may be disposed within FPC 320 and/or FPC 322 and attached to overhanging portion 124 of TFT glass layer 214. Strain gauge 309 may include rows of conductors 502 and columns of conductors 504 that overlap in separate planes, for example, forming a mesh 514. In the embodiment of FIG. 5, conductors 502, 504 are connected to strain-gauge controller 310 to measure the electrical characteristics of mesh 514.

In one embodiment, the conductors 502, 504 may include Indium Tin Oxide (ITO). In other embodiments, conductors 502, 504 may include gold, copper, silver, carbon nanotubes, metal oxide, or other conductive or semiconductive materials. In yet another embodiment, the conductors may include more than one or any combination of these conductive or semiconductive materials.

As conductors 502, 504 deform (e.g., stretch) and/or move relative to each other, strain-gauge controller 310 may measure the changing electrical characteristics of mesh 514. The electrical characteristics that change may include the resistance of conductor 502, 504 that is deformed or stretched, and/or the parasitic reactance and/or resistance between any two conductors 502, 504 as the distance between conductors 502, 504 changes. The measurement of the resistance and/or reactance in different locations of mesh 514 may indicate the strain applied to the different locations, and thus the deformation of TFT glass layer 214 and/or color-filter glass layer 210, for example.

The number of locations that strain gauge 309 may measure may be hundreds, thousand, tens of thousands, millions, tens of millions of locations, or more. The number of locations may depend on the number of horizontal conductors 502 and/or the number of vertical conductors 504. For example, the number of locations for measurement in mesh 514 as shown in FIG. 5 may be 36 (i.e., the product of the number of horizontal conductors 502 and the number vertical conductors 504).

Strain-gauge controller 310 may continuously or periodically measure the resistance and/or reactance at different locations of mesh 514. Strain measurements may be taken by strain gauge 309 every second or fraction of a second (every nanosecond, microsecond, picosecond, or every 0.1, 0.01, 0.001, 0.0001, 0.00001, 0.000001 seconds). In one embodiment, these measurements may be received by strain-gauge controller 310, processed by a processor, and recorded in a memory in display device 100. Because strain gauge 309 may include analog circuits to measure strain, mesh 514 may output continuous, analog signals that are sampled and quantized by strain-gauge controller 310. This configuration may allow for sampling to be performed at the clock rate of processor 610, for example.

Figure 6:
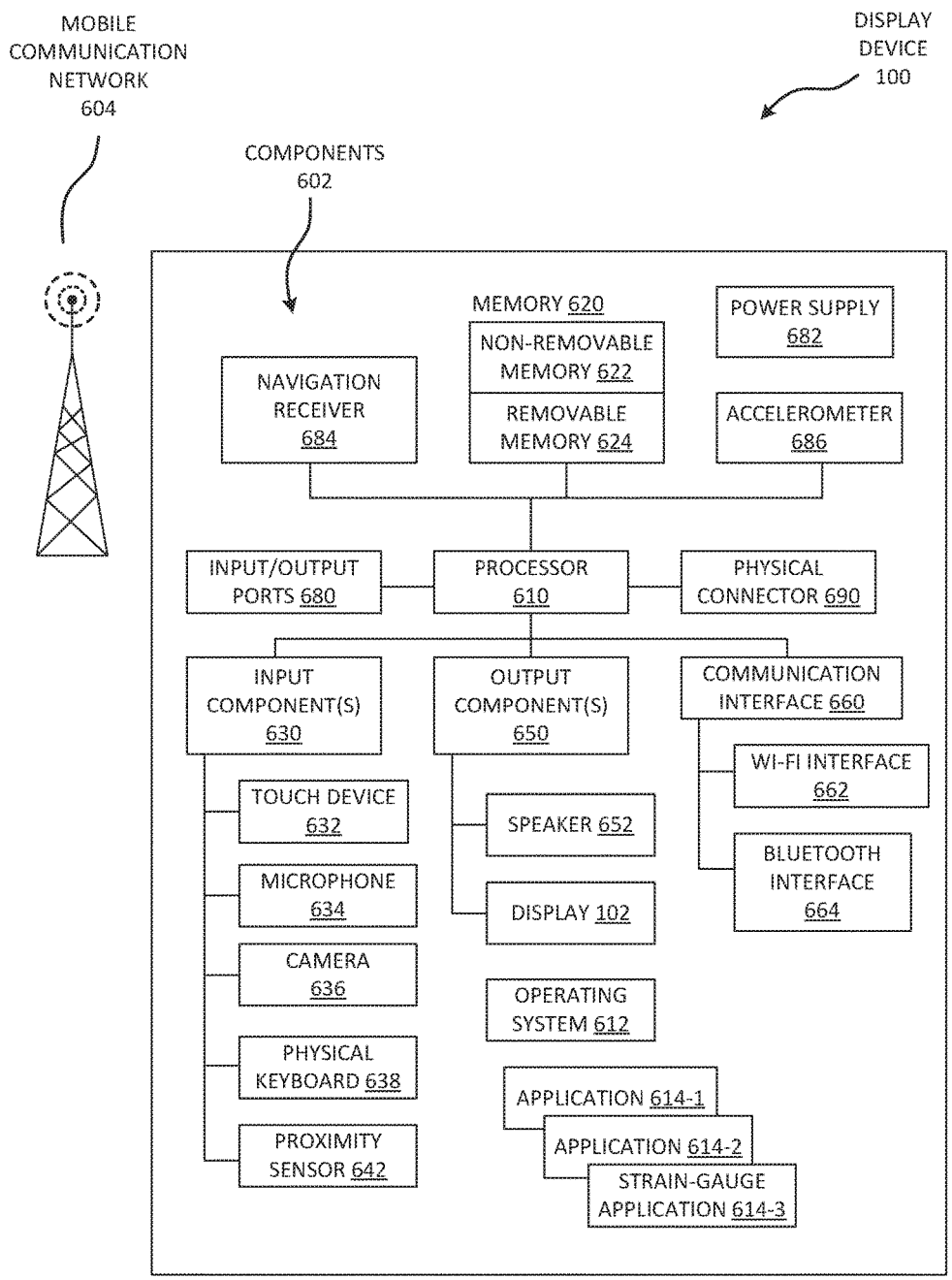
FIG. 6 is a block diagram of exemplary components in one embodiment of a display device.

As noted above, display device 100 may include more components than shown in FIGS. 1A through 4B. FIG. 6 is a block diagram illustrating additional components 602 of display device 100. As illustrated, display device 100 may include a controller or processor 610, an operating system (OS) 612, one or more application programs 614, a memory 620, input components 630, output components 650, a wireless communication interface 660, input/output ports 680, a power supply 682, an accelerometer 686, and/or a physical connector 690.

Processor 610 may include one or more microprocessors, ASICs, signal processors, or other control and processing logic circuitry. Processor 610 may perform tasks such as signal coding, data processing, input/output processing, and/or power control.

OS 612 may control the allocation and usage of the components in and provide support for one or more application programs 614, OS 612 may include MICROSOFT® WINDOWS®, Android, Linux, Apple iOS, Apple Mac OS, and/or Unix, for example.

In one embodiment, applications 614 can include strain-gauge application 614-3. Strain-gauge application 614-3 can send instructions to strain-gauge controller 310 and receive information from strain-gauge controller 310, such as strain measurements. Strain-gauge application 614-3 can store these measurements in memory 620 of display device 100. Strain-gauge application 614-3 may be stored in memory 620 executed by processor 610. Strain-gauge application 614-3 can implement all or portions of a process, for example, such as the process described below with respect to FIG. 9. In some embodiments, OS 612 can implement some or all of strain-gauge application 614-3

In one embodiment, processor 610, memory 620 (storing strain-gauge application 614-3), and strain gauge 309 (e.g., integrated into display 102) are in the same display device (e.g., all in the same housing, such as housing 110 or integrated chassis 205). This embodiment s in contrast to an embodiment in which strain gauges (which are attached to strain gauge 309) include wires leading from the display device being tested for storing strain measurements off of display device 100.

Application programs 614 can also include mobile computing applications (e.g., image-capture applications, email applications, calendars, contact managers, web browsers, messaging applications), or any other computing application.

Memory 620 may include non-removable memory 622 and/or removable memory 624. Memory 620 may include random-access memory (RAM), read-only memory (ROM), flash memory, a hard disk, or other memory storage devices. Memory 620 (e.g., removable memory 622) can include flash memory or a Subscriber Identity Module (SIM) card, as used in a global system for mobile communications (GSM) network, or other memory storage technologies.

Memory 620 may be used for storing data and/or code for running OS 612 and application programs 614. Example data can include web pages, text, images, sound files, video data, or other data sets to be sent to and/or received from one or more network servers or other devices via one or more wired or wireless networks. Memory 620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Input components 630 may include a touch device 632 (e.g., touch panel 202), a microphone 634, a camera 636, physical keyboard 638, and/or proximity sensor 642. Output components 650 may include a speaker 652 and/or display 102. Some components can serve more than one input/output function. For example, touch device 632 and display 102 can be combined into a single input/output device.

Communication interface 660 may include a wireless interface (e.g., a wireless mode such as a Wi-Fi interface 662 and/or a Bluetooth interface 664. Communication interface 660 may be coupled to an antenna (not shown) and may support two-way communication between the processor 610 and external devices. Communication interface 660 can include a cellular modem for communicating with the mobile communication network 604 and/or other radio-based interfaces (e.g., Bluetooth or Wi-Fi). The communication interface 660 may be configured for communication with one or more cellular networks, such as a GSM network for data and voice communication within a single cellular network, between cellular networks, or between the mobile device and a public switched telephone network (PSTN). Communication interface 660 may include a wired interface, such as a physical Ethernet port.

Device 100 can further include an input/output port(s) 680, a power supply 682, a satellite navigation system receiver 684, such as a Global Positioning System (GPS) receiver, an accelerometer 686, a gyroscope (not shown), and/or a physical connector 690, which can be a USB port, and/or an IEEE 1394 (FireWire) port. Components 602 described here are not required or all-inclusive, as components can be removed and other components included. For example, components 602 may include a physical keyboard (not shown).

Any component 602 in device 100 can communicate with any other component 602, although not all connections between components 602 are shown. Device 100 can be any of a variety of computing devices (e.g., cell or mobile phone, smartphone, and/or handheld computer) and can allow wireless two-way communication with wired or wireless communication networks, such as mobile communication network 604.

Figure 7:
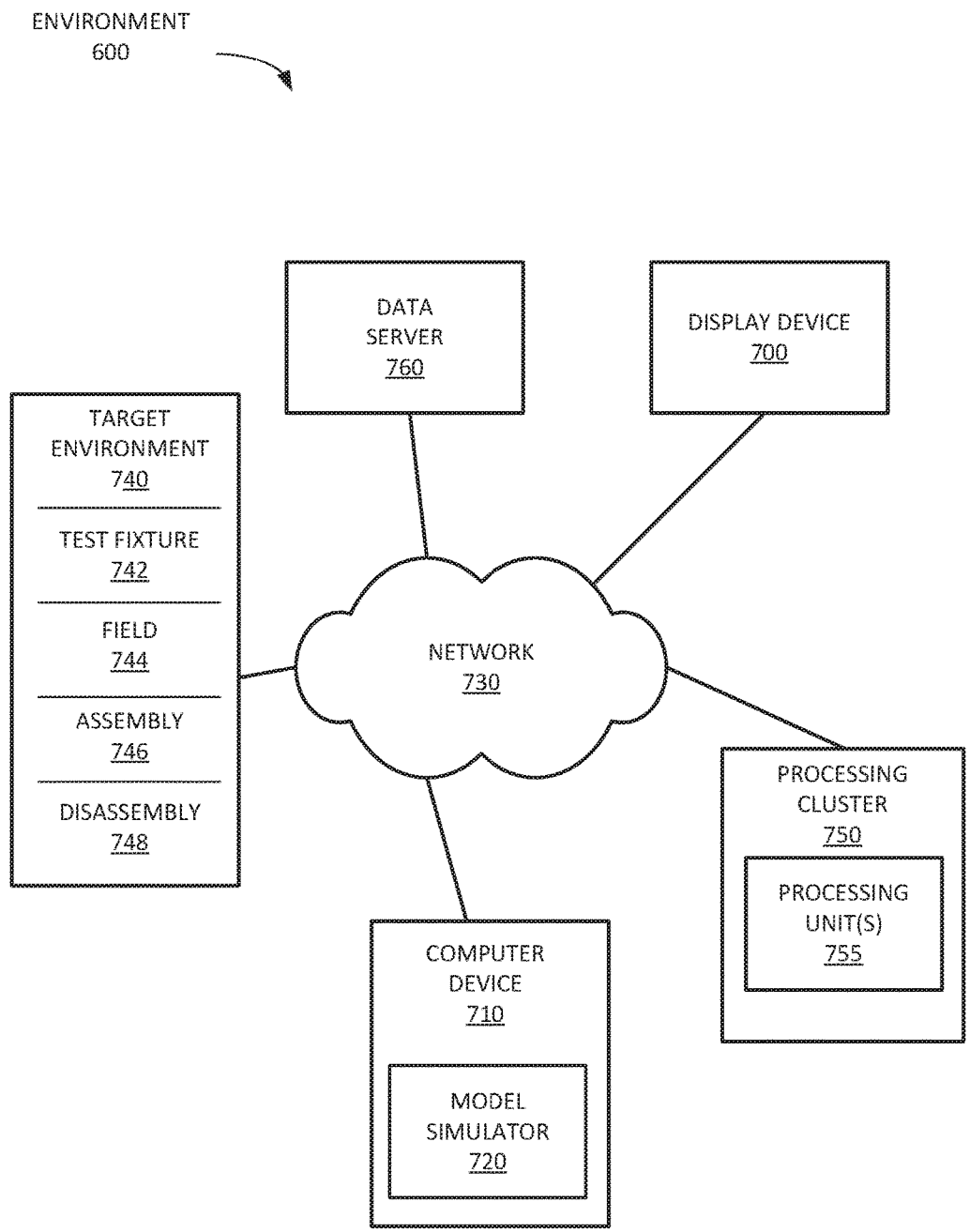
FIG. 7 is a block diagram of an exemplary environment for implementing embodiments described herein.

FIG. 7 is a block diagram of an exemplary environment 700 for implementing methods and systems described herein. As shown in FIG. 7, environment 700 may include a computer device 710, a network 730, target environment 740, display device 100, a processing cluster 750, and a data server 760.

Network 730 may enable any device in environment 700 to communicate with any other device in environment 700. Network 730 may include one or more wired and/or wireless networks. For example, network 730 may include a cellular or mobile network, the Public Land Mobile Network (PLMN), a long-term evolution (LTE) network, a code-division multiple-access (CDMA) network, a GSM network, a general packet radio services (GPRS) network, a Wi-Fi network, and/or an Ethernet network. Network 730 may include a local area network (LAN), a wide area network (WAN), a metropolitan area network (MAN), an ad hoc network, an intranet, the internet, a fiber optic-based network, and/or a satellite network. Network 730 may include any combination of these networks.

Computer device 710 may include one or more computer modules, such as a personal computer, a workstation, a server device, a blade server, a mainframe, a laptop, a tablet computer, or another type of computation or communication device. Computer device 710 may include a model simulator 720.

Model simulator 720 may include a software tool that enables creation, modification, design, and/or simulation of models representing dynamic systems. A dynamic system is a system in which a response at any given time may be a function of its input stimuli, its current state, and/or a current time. The model may represent dimensions and physical connections (e.g., to specify rigid mechanical connections, voids with volume flow) operating in accordance with the laws of physics (e.g., "physics-based rules"). A model of a dynamic system may include, for example, a model of display 100, a model of a hard surface, and a model of forces (e.g., gravity) being exerted on display 100 and/or the hard surface.

The simulation or execution of a model of a dynamic system may include elemental dynamic systems (e.g., finite element analysis or FEA), such as a differential equation system (e.g., to specify continuous-time behavior), a difference equation system (e.g., to specify discrete-time behavior), and/or an algebraic equation system (e.g., to specify constraints). Attributes of the model may include sample times for executing the model elements. A simulation of a model of a dynamic physical system may include a continuous sample time such as a continuous-time integration function that may integrate an input value as time of execution progresses. During execution of the model, the continuous-time behavior may be approximated by a numerical integration scheme that is part of a numerical solver. The numerical solver may take discrete steps to advance the execution time, and these discrete steps may be constant or fixed or variable during an execution.

Model simulator 720 may perform FEA for solving strain and force calculations on a model of display device 100 (e.g., on color-lifter glass layer 210) under different conditions, such as being dropped from a distance and a model of display device 100 (and components) experiencing a force at a particular location with a particular magnitude and direction.

Model simulator 720 may be implemented using, for example, MATRIXx from National Instruments; MATLAB by The MathWorks. Inc.; Mathematical from Wolfram Research. Inc.; Mathcad from Mathsoft Engineering & Education Inc.; Maple from Maplesoft; Extend from imagine That Inc.; or Modelica and/or Dymola from Dassault Systemes.

Processing cluster 750 includes processing resources that model simulator 720 may use to model a dynamic system including display device 100. Processing cluster 750 may include one or more processing unit(s) 755. Processing unit 755 may perform parallel processing (e.g., finite element analysis) of a model of display device 100 in a dynamic system. Model simulator 720 may send an operation to processing cluster 750 to perform, and processing cluster 750 can divide the operation into tasks and distribute the tasks among processing units 755. Processing cluster 750 receives results of the tasks from processing units 755, generates a result of the operation, and sends the result of the operation to model simulator 720.

In one implementation, a processing unit 755 may include a graphic processing unit (GPU). A GPU may include one or more devices that include specialized circuits for performing operations relating to performing a large number of operations in parallel. Processing unit 755 may correspond to a single core of a multi-core processor. Processing unit 755 may include a computer device that is part of a cluster of computer devices, e.g., computing devices operating as part of a computing cloud.

Data server 760 may include a computing device that manages and/or stores programs and data associated with collecting and analyzing strain-gauge data. Data server 760 may include one or more programs, such as a web server (e.g., Apache, or MICROSOFT INTERNET INFORMATION SERVICES® or IIS®), a database (e.g., MySQL, or MICROSOFT ACCESS®), or other applications.

Data server 760 includes one or more computing devices having memory to store data from display devices 100, such as measurements from strain gauge 309 of device 100. In one embodiment, the user of device 100 must take an affirmative action before data is collected from device 100 and stored in data server 760. Once the user has taken an affirmative action to store data in data server 760, the user can take an affirmative action to prevent any further collection of data. In addition, the user of any device 100 may take an affirmative action to delete any previous user data stored to data server 760.

Target environment 740 includes the environment in which display device 100 will operate. For example, target environment 740 may include "the field" 744, such as the home of a consumer using display device 100. Target environment 740 may include test fixture 742 where engineers test display device 100 by dropping display device 100 from a height onto a hard surface. Target environment 740 could include the manufacturing floor during assembly 746 or disassembly 748 of display device 100. Model simulator 720 models display device 100 in these dynamic system environments.

Figure 8A:
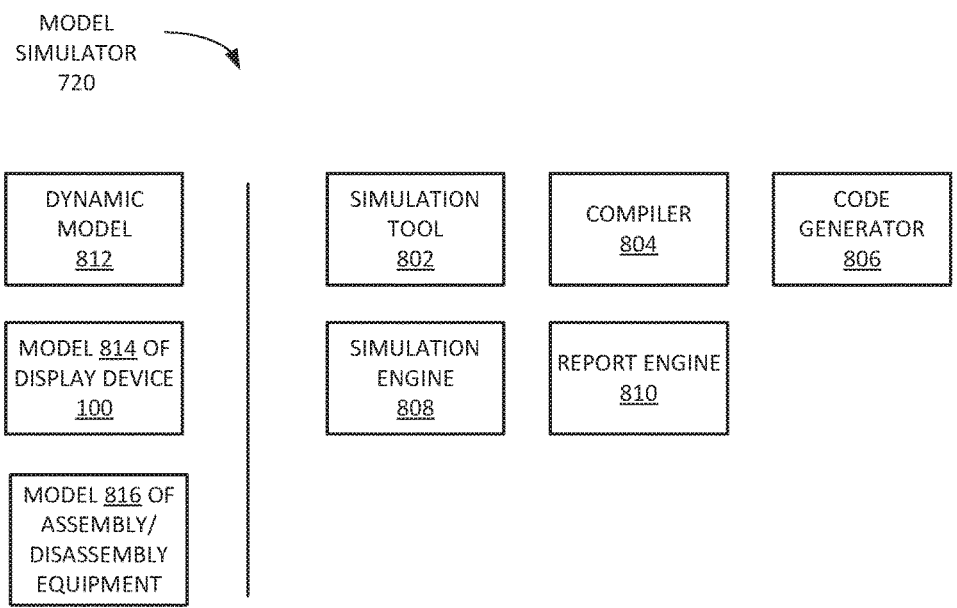
FIG. 8A is a block diagram illustrating exemplary components of a model simulation system.

As discussed above, display device 100 may include a set of sensors and/or a set of controllers (e.g., strain gauge 309). Model simulator 720 may receive data (e.g., strain measurements) from display device 100 (e.g., through network 730). Model simulator 720 may then use the received data (e.g., the received strain limits) as input of parameters to a model of a dynamic system and/or display device 100. As shown in FIG. 8A, model simulator 720 includes a dynamic model 812 and a model 814 of display device 100. Model simulator 720 may also include a simulation tool 802, a compiler 804, a code generator 806, a simulation engine 808, and a report engine 810.

Dynamic model 812 may include a model of display device 100 in a dynamic system, such as: display device 100 being dropped in a gravitational field onto a hard surface; display device 100 being assembled during manufacturing; and/or display device 100 being disassembled for recycling or refurbishment.

Model 814 of display device 100 may include models of components of display device 100 and/or display 102 (and the interconnections between components), such as models of chassis 205, housing 110, protective layer 106, touch panel 202, polarizer 208, color-filter glass layer 210, liquid crystals 212, TFT glass layer 214, polarizer 216, light guide 218, and/or reflector 226. Model 814 of display device 100 associates strain measurements that correspond to failures of display 102, for example. Model 816 of assembly or disassembly equipment may include models of components of the equipment that assembles display device 100 and/or disassembles display device 100.

Simulation tool 802 may include an application for building a model, such as dynamic model 812 and/or a model 814 of display device 100. The designer of display device 100 can use simulation tool 802 to build a model having executable semantics, such as a dynamic system model. The designer may use simulation tool 802 to create, display, modify, diagnose, annotate, delete, and/or print, model entities and/or connections. Simulation tool 802 may provide a user with an editor or graphical user interface for constructing or interacting with models.

Compiler 804 may compile a model, such as dynamic system model, into an executable format. Code generator 806 may generate code from a compiled model produced by compiler 804. The generated code may be executed on computer device 710 to produce a modeling result. Simulation engine 808 may perform operations for executing a model to simulate a system.

Report engine 810 may produce a report based on information in model simulator 720. For example, report engine 810 may produce a report indicating whether a display device 100 satisfies design specifications (e.g., whether glass has broken or not). Embodiments of report engine 810 can produce reports in an electronic format for display on output device 880, for example.

Although FIGS. 7 and 8A show exemplary components of environment 700 and model simulator 720, in other implementations, environment 700 and/or model simulator 720 may include fewer components, different components, differently arranged components, and/or additional components than those depicted in FIG. 7. Additionally, one or more components of environment 700 and/or model simulator 720 may perform one or more tasks described as being performed by one or more other components of environment 700 and/or model simulator 720.

Figure 8B:
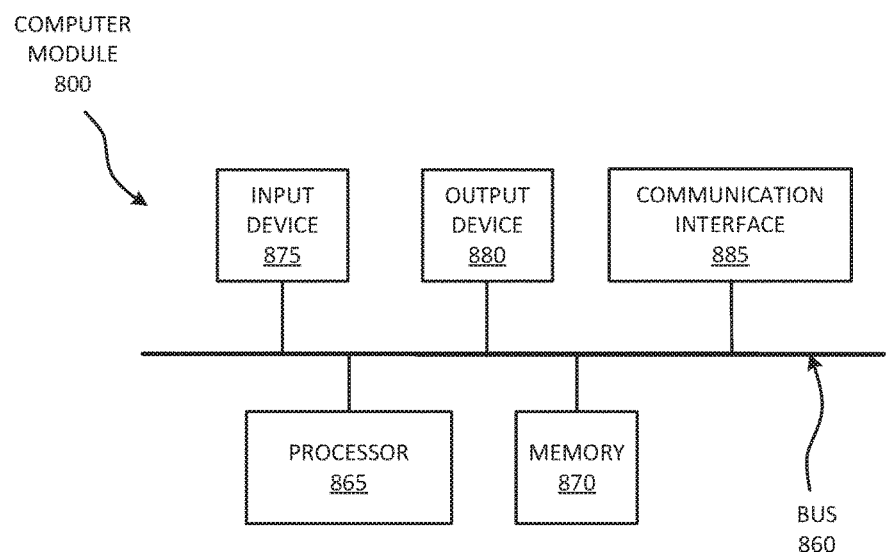
FIG. 8B is a block diagram illustrating exemplary components of a computer module according to one embodiment.

Devices in environment 700 may each include one or more computing modules. FIG. 8B is a block diagram illustrating exemplary components of an exemplary computer module 800 according to one embodiment. As shown in FIG. 83, computer device 800 may include a bus 860, a processor 865, a memory 870, an input device 875, an output device 880, and a communication interface 885.

Bus 860 enables communication among the components of computer module 800. Processor 865 may include, for example, one or more single-core and/or or multi-core processors, microprocessors, and/or processing logic (e.g., application specific integrated circuits (ASICs), field programmable gate arrays (FPGAs), and/or ARM processors) that interpret and execute instructions.

Memory 870 may include a RAM device or another type of dynamic storage device that may store information and instructions for execution by processor 265. Memory 870 may include a ROM device or another type of static storage device that may store static information and instructions for use by processor 865. Memory 870 may include a magnetic and/or optical recording memory device, and/or a removable form of memory, such as a flash memory stick. Memory 870 is a computer-readable medium, such as a non-transitory memory device.

Input device 875 enables an operator to input information into computer module 800. Input device 875 may include, for example, a keypad, a keyboard, a button, or an input jack for an input device such as a keypad or a keyboard, or a camera. Output device 880 outputs information to the operator. Output device 880 may include, for example, display 102, a light, or a speaker.

Display 102 may include, for example, a cathode ray tube (CRT), plasma display device, light emitting diode (LED) display device, or liquid crystal display (LCD) device. Display 102 may be configured to receive user inputs (e.g., via a touch panel 202).

Communication interface 885 may include a transmitter and/or a receiver (e.g., a transceiver) that enables computer module 800 to communicate with other devices. Communication interface 885 may include a network interface card, and/or a wireless interface card, for example.

Software instructions may be read into memory 870 from another computer-readable medium, or from another device via communication interface 885. The software instructions contained in memory 870 may cause processor 865 to perform processes that is described later. Alternatively, hardwired circuitry may be used in place of or in combination with software instructions to implement processes described herein. Thus, implementations described herein are not limited to any specific combination of hardware circuitry and software.

Computer module 800, employed in computing device 710, may perform operations relating to simulating a model of strain and force experienced by a model dynamic system including a model of display device 100 (e.g., including a model of a chassis and/or glass). Computer module 800 may perform these operations in response to processor 865 executing software instructions stored in a computer-readable medium, such as memory 870.

Although FIG. 8B shows exemplary components of computer module 800, in other implementations, computer module 800 may include fewer components, different components, additional components, or differently arranged components than depicted in FIG. 8B.

Figure 9:
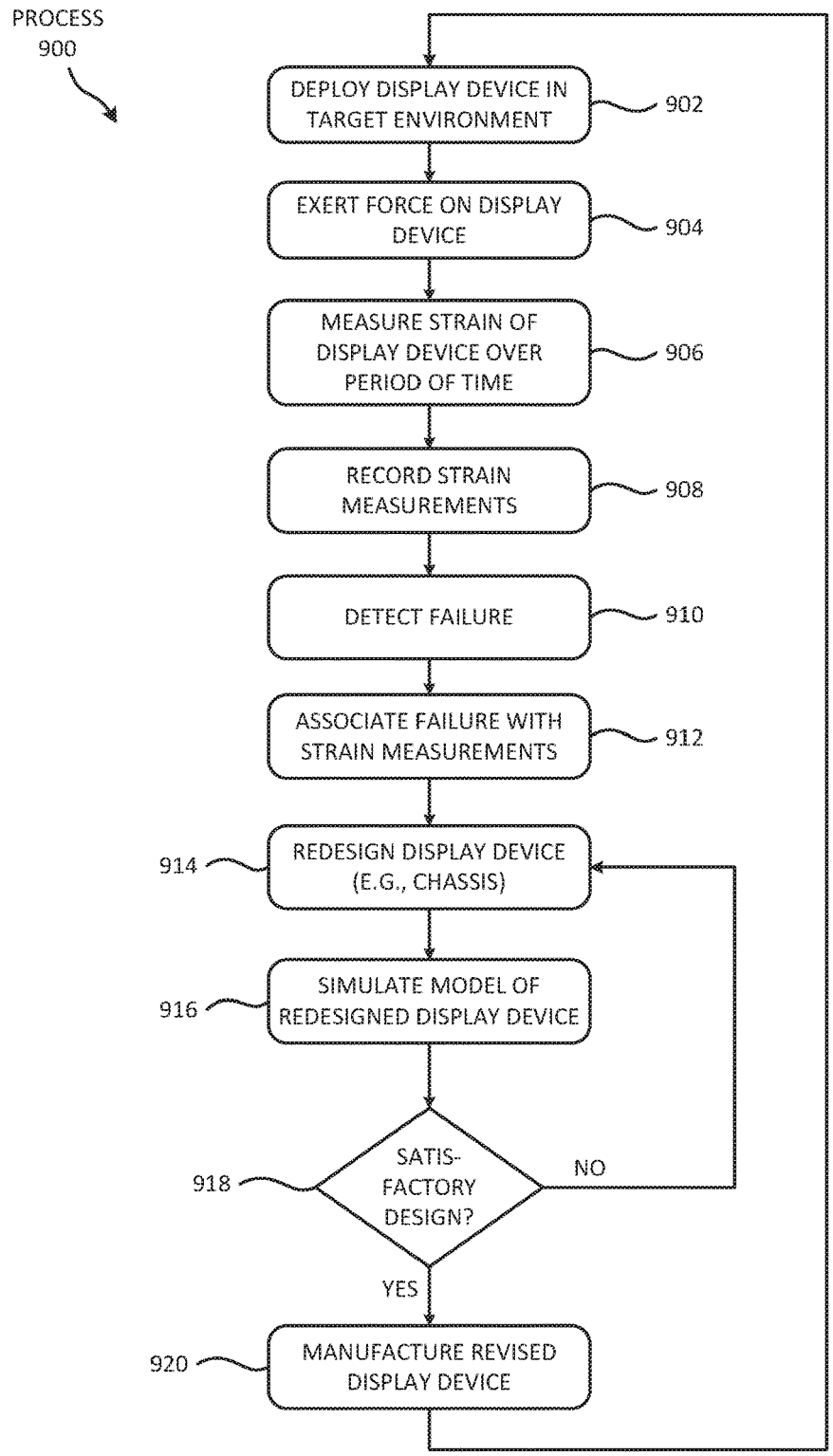
FIG. 9 is a flowchart of a process for measuring strain limits of a display device in one embodiment.

FIG. 9 is a flowchart of a process 900 for measuring strain limits of a display device. Process 900 may be performed by the devices in environment 700, such as display device 100 running OS 612 and/or application 614-3, and by computer device 710 and model simulator 720. Process 900 is described below with three examples of target environment 740. The first example includes dropping display 102 of display device 100 in test fixture 742. The second example includes display device being deployed in the field 744 (e.g., with an end user). The third example includes display device 100 being assembled and disassembled in assembly target environment 748 and disassembly target environment 748.

Process 900 may begin by placing a display device 100 (e.g., a test or first device) in the target environment (block 902). In the following first example, display device 100 is placed in a test fixture 742 of target environment 740. Device 100 includes one or more chassis to hold display 102. For example, chassis 205, housing 110, display chassis 262A, and/or system chassis 264A hold display 102. A force is exerted on display device 100 and/or the components of display device 100 (block 904). In the current example, test fixture 742 may exert force on display device 100 for the purpose of testing the strength of display device 100 and/or display 102. In one case, test fixture drops display device 100 by 1, 2, 3, 4, 5, or more feet onto a hard surface. In one embodiment, test fixture drops display device 100 from a height of between 1.25 m to 1.5 m. As another example, test fixture 742 has a frame in which display device 100 is mounted and test fixture 742 twists or bends display device 100.

Process 900 continues by measuring strain on display 102 of display device 100 over a period of time (e.g., a test or first period) (block 906) (such as a period of time in which a failure occurs). In one embodiment, the strain measurements are taken by integrated strain gauge 309 in or on display 102 (e.g., on TFT glass layer 214). Strain-gauge application 614-3 (or OS 612) may instruct strain-gauge controller 310 to measure strain from strain gauge 309. The measurements may be from many different locations of strain gauge 309 (e.g., many different locations on the surface of TFT glass layer 214). Because strain gauge 309 is on the surface of TFT glass layer 214, the strain measurements may indicate the degree of deformation of or strain on TFT glass layer 214. Since TFT glass layer 214, however, is tightly assembled in display 102 with other components, the strain measurements are also indicative of the force on or the deformation of the other components of display 102, such as protective layer 106, touch panel 202, polarizer 208, liquid crystals 212, color-filter glass layer 210, polarizer 216, light guide 218, and/or reflector 226. Strain may be measured during the test period, such as during a fall from a height until after impact on a hard surface.

As noted above, strain measurements may be taken by strain gauge 309 every second or fraction of a second and at hundreds, thousands, millions, or tens of millions of locations. In addition, FPC 320 (incorporating strain gauge 309) may enable overhanging portion 124 of TFT glass layer 214 of display 102 to resist flexing upward (in the Z direction). Likewise, FPC 322 (incorporating strain gauge 309') may enable overhanging portion 124 to resist flexing downward (in the negative Z direction). Thus, in this embodiment, FPC 320/322 may measure strain and also resist the flexing or deformation of overhanging portion 124 to help prevent a failure, such as a crack (e.g., crack 130) in TFT glass layer 214 and elsewhere.

The strain measurements are recorded (block 908). In one configuration, strain-gauge application 614-3 stores the strain measurements in memory 620 of the device being tested (e.g., display device 100 itself). In another configuration, strain-gauge application 614-3 stores the measurements in data server 760. In one embodiment, strain measurements may be associated with the time at which the corresponding strain measurement was recorded.

In these examples, the user of device 100 must take an affirmative action before data is collected and stored in display device 100. Once the user has taken an affirmative action to collect and store this data in data display device 100, the user can also take an affirmative action to prevent any further collection of data. In addition, the user or display device 100 may take an affirmative action to delete any user data stored to display device 100.

Process 900 includes detecting a failure (block 910) of display 102 during the time period. In the current example, failure is broken glass in display 102 (or other catastrophic failure of display 102) when display device 100 lands on the hard surface after having been dropped from a height. Detecting a failure may include a visual inspection of display 102 (e.g., overhanging portion 124) to determine if it has been cracked or otherwise damaged and/or determining if the touch screen input still functions properly. Detecting the failure may include detecting one or more broken protective layer 106, touch panel 202, polarizer 208, color-filter glass layer 210, liquid crystals 212, TFT glass layer 214, polarizer 216, light guide 218, and/or reflector 226.

Process 900 includes associating the failure with the recorded display measurements (block 912). In the current example, not all the strain gauge measurements are necessarily associated with display 102 breaking. In this case, the maximum strain measurements may be assumed to be associated with display 102 breaking. In one implementation, application 614-3 also stores measurements from accelerometer 686. In this case, the strain measurements associated with a rapid deceleration or a rapid acceleration may be associated with the failure (e.g., the absolute magnitude of acceleration passing a threshold). The measurements associated with the failure may be referred to as "strain limits." These strain limits may form part of a model of display 102 used for simulation of a dynamic environment.

Given the information learned by recording the strain experienced by display device 100, the designer may redesign device 100 (block 914) to reduce the risk of failure. For example, the designer could change or revise the design of housing 110, system chassis 264, display chassis 262, chassis 205, and/or other components of display device 100 to make these components more or less stiff, for example. Rather than manufacture the revised device and test the revised display device 100, the designer may simulate a model 814 of the redesigned display device 100. The model 814 of the redesigned display device may include a model of display 102, in which the strain limits may be associated with failure.

Thus, process 900 may continue by simulating dynamic model 812 including a model 814 of a redesigned device (e.g., a revised device or a second device) (block 916). The dynamic model 812 may include, for example, dropping display device 100 (having display 102) in a gravitational field whereby it lands on a hard surface. In one embodiment, simulation of the model 814 of the revised display device includes simulating the model 814 of the redesigned device 100 based on what was learned during the test in the target environment, e.g., the drop test and associated strain measurements associated with the failure (from block 912). That is, the model 814 of the redesigned display device 100 may include a model of display 102 that failed (e.g., the model of display 102 or a failure of the model of display 102 is informed by or associated with the strain measurements associated with failure). Model 814 of the redesigned device may include a model of any redesigned component of display device 100 (e.g., discussed above with respect to FIGS. 2A through 2D). The simulation may include modelling the dropping of the model of display device 100 from a distance (e.g., applying force on the model of display device 100) and determining if the model of display 102 fails. In one embodiment model simulator 720 simulates dynamic model 812 including model 814 of display device 100.

If the simulations are not successful (block 918: NO), then device 100 may be redesigned (block 914) and simulated again (block 916) until a redesign is successful (block 918: YES). A successful design may be a design of a chassis (e.g., chassis 205) that result in a failure 5% of the time when a force on display device reaches a certain maximum (e.g., reaches a threshold), for example. Because of the iterative process (blocks 914, 916, and 918), the design and redesign process may be accelerated (e.g., without having to manufacture every redesign of device 100). This iterative process may be made possible by a better informed simulation process, e.g., better informed by strain gauge measurements of strain gauge 309 and strain-gauge controller 310.

Once a redesign is satisfactory (block 918: YES), then the redesigned (or second) display device 100 may be manufactured (block 920) and process 900 may begin again with the deployment of the redesigned display device 100 being deployed for another test or in the field (block 902). Thus, process 900 may continue in an iterative, rapid prototyping process. The redesigned chassis secures the redesigned second display device. Like the first display device, the redesigned, second display device includes a second integrated strain gauge in or on the second display (e.g., integrated into FPC 320/322) for recording strain measurements at a plurality of locations on the display. The satisfactory redesign may become the final design, and therefore the second (or subsequent) manufacture (block 920) of display device 100 according to the satisfactory redesign may be the final product sold to consumers.

In one embodiment, simulating the model (block 916) of the redesigned (second) display device includes simulating deformation of the model of the display based on the identified one or more strain measurements.

This iterative process 900 may continue measuring the strain of the second display of the redesigned device over another period (e.g., second period) of time (block 906) and recording second strain measurements (block 908) while applying a force (block 904). Process 900 may detect a second failure of the second display during the second time period (block 910) and associate one or more of the second strain measurements with the second failure (block 912). Process 900 may simulate a model of yet another (e.g., a third) redesigned device that includes a model of the display (e.g., the display that has failed again) and a model of yet another redesigned chassis (e.g., a third chassis) different than the first chassis and second chassis (block 916) including simulating deformation of the model of the display based on the identified one or more strain measurements.

In the second example, display device 100 is not deployed in test fixture 742 but instead is deployed in the field 744 (block 902). The field 744 may include test devices given to testers and/or developers or even products sold to consumers. During this type of testing, display device 100 experiences forces (block 904) through regular wear and tear. Regular wear and tear could include, for example, dropping display device 100 on the ground accidently, sitting on display device 100 accidently, or throwing display device 100 to a friend.

During this time, strain-gauge controller 310 and strain gauge 309 may measure strain on display 102 and record the measurements in memory 620 of display device 100. Display device 100 may also record the time, date, location, and accelerometer measurements associated with time and/or the strain measurements.

In this example, if display device 100 measures (block 906) and records (block 908) a very high strain measurement that may be associated with a failure (block 910), then the strain measurement (and the other information) may be sent to data server 760. Alternatively, or in addition, if display device 100 measures and records very high deceleration or acceleration, then strain measurement, acceleration information, and/or other information may be sent to data server 760. In this case, strain measurements associated with a rapid deceleration or acceleration may be associated with the failure (e.g., the absolute magnitude of acceleration passing a threshold).

In this example, the user of device 100 must take an affirmative action before data is collected and stored in data server 760. Once the user has taken an affirmative action to collect and store this data in data server 760, the user can also take an affirmative action to prevent any further collection of data. In addition, the user of display device 100 may take an affirmative action to delete any user data stored to data server 760.

In one embodiment, the user of display device 100 may be prompted and asked if display 102 of her display device 100 has broken (block 910) (e.g., when strain measurements pass a threshold or deceleration passes a threshold). The user of display device 100 may input into display device 100 whether the display has broken or not. If the display has broken (block 910) or if there is no response to the question (block 910), then display device 100 may send the strain measurement data to data server 760. In another embodiment, the user of display device 100 may be asked (via speaker 652) whether display 102 has broken. The user may respond by voice via microphone 634 with "yes" or "no." In this case, display device 100 may go through redesign (block 914), simulation (block 916) as described above with the strain measurements returned from the field 744.

In the third example, once strain limits (block 908) are determined, the following dynamic model may be determined: dynamic assembly by assembly equipment, and dynamic disassembly by disassembly equipment. Assembly equipment and the assembly process may itself be a model that is simulated or executed by (block 916). Further, disassembly equipment and the disassembly process may also be a model that is simulated or executed by (block 916). Assembly equipment may be lightened and assembly may be accelerated (e.g., the motion of robotic equipment) based on strain measurements (block 912) determined during testing and based on models 814 of chassis. Disassembly equipment may be lightened and disassembly may be accelerated (e.g., the motion of robotic equipment) based on strain measurements (block 912) determined during testing and based on models 814 of chassis. In one embodiment, the assembly or disassembly equipment may be programmed to move faster or slower, or apply more or less forced based on strain measurements (block 912) determined during testing and based on models 814 of chassis.

In one embodiment, assembly and disassembly may occur when the display device 100 is turned on (e.g., OS 612 and/or strain-gauge application 614-3 is running). In other words, display device 100 may be deployed (block 902) in the assembly target environment 746 and the disassembly target environment 748. In this example, when assembly or disassembly exerts force on display device 100 (block 904), the strain may be measured over time (block 906) and recorded (block 908). Failure can be detected (block 910) and associated with the appropriate strain measurements (block 912). The strain measurements may be used to further redesign and simulate new display devices 100. In an alternative method, the strain measured by strain-gauge controller 310 may be reported to OS 612.

No element, act, or instruction used in the description of the present application should be construed as critical or essential to the invention unless explicitly described as such.

As used herein, the articles "a" and "the" and the term "one of" are intended to include one or more items. Further, the phrase "based on" means "based, at least in part, on" unless explicitly stated otherwise.

In the preceding specification, various preferred embodiments are described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A display module comprising:
a thin-film transistor (TFT) glass layer having a top surface and a bottom surface;
a color-filter glass layer having a top surface and a bottom surface, wherein the bottom surface of the color-filter glass layer is proximate the top surface of the TFT glass layer, wherein the TFT glass layer extends beyond the color-filter glass layer to form an overhanging portion of the TFT glass layer, wherein the overhanging portion is flexible; and
a flexible printed circuit (FPC) affixed to the overhanging portion, wherein the FPC includes an integrated strain gauge for measuring strain at a plurality of locations on the overhanging portion of the TFT glass layer.

2. The display module of claim 1, wherein the FPC resists flexing of the overhanging portion of the TFT glass layer.

3. The display module of claim 2, wherein the FPC is affixed to the overhanging portion on the top surface of the TFT glass layer.

4. The display module of claim 2, wherein the FPC is affixed to the overhanging portion on the bottom surface of the TFT glass layer.

5. The display module of claim 2, wherein the FPC is affixed to the overhanging portion on the top surface of the TFT glass layer and on the bottom surface of the TFT glass layer.

6. A device comprising:
a display including:
a thin-film transistor (TFT) glass layer having a top surface and a bottom surface,
a color-filter glass layer having a top surface and a bottom surface, wherein the bottom surface of the color-filter glass layer is proximate the top surface of the TFT glass layer, wherein the TFT glass layer extends beyond the color-filter glass layer to form an overhanging portion of the TFT glass layer, wherein the overhanging portion is flexible, and
a flexible printed circuit (FPC) affixed to the overhanging portion, wherein the FPC includes an integrated strain gauge to measure strain at a plurality of locations on the overhanging portion of the TFT glass layer;
a chassis to secure the display in the device; and
a processor, within the chassis, to instruct the integrated strain gauge to measure the strain.

7. The device of claim 6, wherein the FPC resists flexing by the overhanging portion of the TFT glass layer.

8. The device of claim 7, wherein the FPC is affixed to the overhanging portion on the top surface of the TFT glass layer.

9. The device of claim 7, wherein the FPC is affixed to the overhanging portion on the bottom surface of the TFT glass layer.

10. The device of claim 7, wherein the FPC is affixed to the overhanging portion on the bottom surface of the TFT glass layer and on the top surface of the TFT glass layer.

11. The device of claim 6, wherein the processor is configured to instruct the integrated strain gauge to measure the strain over a period of time.

12. The device of claim 11, further comprising:
a memory to store strain measurements taken by the integrated strain gauge, wherein the processor is configured to store the strain measurements in the memory.

* * * * *